US009385985B2

(12) United States Patent  (10) Patent No.: US 9,385,985 B2
Cooper et al.  (45) Date of Patent: Jul. 5, 2016

(54) SYSTEMS AND METHODS FOR ASSISTING USERS WITH CONTACT, ACCESS, AND DISTRIBUTION LISTS

(71) Applicant: Fuji Xerox Co., Ltd., Tokyo (JP)

(72) Inventors: Matthew L. Cooper, San Francisco, CA (US); Jacob Biehl, San Jose, CA (US); Eleanor Rieffel, Redwood City, CA (US); Stephen H. Carman, State College, PA (US)

(73) Assignee: FUJI XEROX., LTD., Tokyo (JP)

( * ) Notice: Subject to any disclaimer, the term of this patent is extended or adjusted under 35 U.S.C. 154(b) by 605 days.

(21) Appl. No.: 13/767,743

(22) Filed: Feb. 14, 2013

(65) Prior Publication Data

US 2014/0229556 A1  Aug. 14, 2014

(51) Int. Cl.
*G06F 15/16* (2006.01)
*H04L 12/58* (2006.01)

(52) U.S. Cl.
CPC .............. *H04L 51/28* (2013.01); *H04L 51/32* (2013.01)

(58) Field of Classification Search
CPC ...... G06Q 10/10; G05Q 10/107; H04L 51/28; H04L 51/32; H04L 29/06843; H04L 67/22
See application file for complete search history.

(56) References Cited

U.S. PATENT DOCUMENTS 7,644,144 B1 * 1/2010 Horvitz et al. ................. 709/223
8,037,143 B1 * 10/2011 Atkins et al. .................. 709/206
2011/0197166 A1 * 8/2011 Girgensohn et al. .......... 715/846

OTHER PUBLICATIONS

Amershi, ReGroup: Interactive Machine Learning for On-Demand Group Creation in Social Networks, Computer Science & Engineering DUB Group, Univ. of Washington, 2012, 10 pgs.
Bird, Latent Social Structure in Open Source Projects, Dept. of Computer Science, Univ. of California, 2008, 12 pgs.
Ducheneaut, Socialization in an Open Source Software Community: A Socio-Technical Analysis, Palo Alto Research Center, 2005, 46 pgs.
Hahn, Emergence of New Project Teams from Open Source Software Developer Networks: Impact of Prior Collaboration Ties, Information Systems Research, vol. 19, No. 3, Sep. 2008, pp. 369-391, 23 pgs.
Iamnitchi, Small-World File-Sharing Communities, Dept. of Computer Science, The University of Chicago, Jul. 13, 2003, 12 pgs.
Madey, The Open Source Software Development Phenomenon: An Analysis Based on Social Network Theory, Eigth Americas Conference on Information Systems, 2002, 8 pgs.

(Continued)

*Primary Examiner* — Chirag R Patel
*Assistant Examiner* — Jean P Mendez Flores
(74) *Attorney, Agent, or Firm* — Morgan, Lewis & Bockius LLP

(57) ABSTRACT

Managing contact groups entails receiving email header information for electronic messages sent during a certain period of time. Each header includes unique identifiers for the sender and each recipient. The set of these unique identifiers from each header forms a de facto group. For each group, the process computes a usage value based on the number of distinct messages corresponding to the group. The process also identifies a set of saved groups, where each saved group is a set of unique identifiers of people, and each saved group has a usage value. The usage value is 0 when the saved group does not equal any de facto group. The process compares the de facto groups and their associated usage values to the saved groups and their associated usage values, and provides a recommendation to modify the set of saved groups based on the comparisons.

23 Claims, 21 Drawing Sheets

(56) References Cited

OTHER PUBLICATIONS

Menges, Modeling and Simulation of E-mail Social Networks: A New Stochastic Agent-Based Approach, Computer Science Department, Courant Institute of Mathematical Sciences, 2008, 9 pgs.

Minto, Recommending Emergent Teams, University of British Columbia, 29th International Conference on Software Engineering Workshops (ICSEW'07) 2007, 8 pgs.

Naddaf, Social Network Analysis and Community Mining in Organizations Based on Email Records, Asymmetric Ventures, Jun. 23, 2010, 9 pgs.

Nurmela, Evaluating CSCL Log Files by Social Network Analysis, ACM Digital Library, 1999, 1 pg.

Roth, Suggesting Friends Using the Implicit Social Graph, Google, Inc., Israel R&D Center, 2010, 9 pgs.

Rowe, Automated Social Hierarchy Detection Through Email Network Analysis, Columbia University, 2007, 9 pgs.

\* cited by examiner

File Server Directories and Files

902 \root\subdir1\subsubdir1\file110
904 \root\subdir1\subsubdir1\file111
906 \root\subdir1\subsubdir1\file112
\root\subdir1\subsubdir1\ ...
910 \root\subdir1\subsubdir2\file120
912 \root\subdir1\subsubdir2\file121
914 \root\subdir1\subsubdir2\file122
\root\subdir1\subsubdir2\ ...
918 \root\subdir1\subsubdir3\file120
920 \root\subdir1\subsubdir3\file121
922 \root\subdir1\subsubdir3\file122
\root\subdir1\subsubdir3\ ...
926 \root\subdir1\subsubdir3\subsubsubdir1\file1310
928 \root\subdir1\subsubdir3\subsubsubdir1\file1311
930 \root\subdir1\subsubdir3\subsubsubdir1\file1312
\root\subdir1\subsubdir3\subsubsubdir1\ ...
934 \root\subdir1\subsubdir3\subsubsubdir1\subsubsubsubdir1\file13110
936 \root\subdir1\subsubdir3\subsubsubdir1\subsubsubsubdir1\file13111
938 \root\subdir1\subsubdir3\subsubsubdir1\subsubsubsubdir1\subsubsubsubdir2\file131110
\root\subdir1\subsubdir3\subsubsubdir1\subsubsubsubdir1\subsubsubsubdir2\ ...
942 \root\subdir2\file20
944 \root\subdir2\file21
946 \root\subdir2\file22
\root\subdir2\ ...

Figure 9

File Access Log 136

| | User | Directory | File | Timestamp |
|---|---|---|---|---|
| 1002→ | A | \root\subdir2 | file20 | date/time $t_1$ |
| 1004→ | A | \root\subdir1\subdir3 | file120 | date/time $t_2$ |
| 1006→ | A | \root\subdir1\subdir3\subsubsubdir1 | file1312 | date/time $t_3$ |
| 1008→ | B | \root\subdir2 | file22 | date/time $t_4$ |
| 1010→ | B | \root\subdir1\subdir3 | file121 | date/time $t_5$ |
| 1012→ | C | \root\subdir2 | file22 | date/time $t_6$ |
| 1014→ | C | \root\subdir1\subdir3\subsubsubdir1 | file1310 | date/time $t_7$ |
| 1016→ | C | \root\subdir1\subdir3\subsubsubdir1 | file1310 | date/time $t_8$ |
| 1018→ | C | \root\subdir1\subdir3\subsubsubdir1\subsubsubsubdir1 | file13111 | date/time $t_9$ |
| 1020→ | D | \root\subdir2 | file21 | date/time $t_{10}$ |
| 1022→ | D | \root\subdir1\subdir3 | file120 | date/time $t_{11}$ |
| 1024→ | D | \root\subdir1\subdir3\subsubsubdir1\subsubsubsubdir1\subsubsubsubsubdir2 | file131120 | date/time $t_{12}$ |
| 1026→ | E | \root\subdir2 | file20 | date/time $t_{13}$ |
| 1028→ | E | \root\subdir1\subdir3\subsubsubdir1 | file1311 | date/time $t_{14}$ |
| 1030→ | F | \root\subdir2 | file20 | date/time $t_{15}$ |
| 1032→ | F | \root\subdir1\subdir3 | file122 | date/time $t_{16}$ |
| 1034→ | G | \root\subdir2 | file21 | date/time $t_{17}$ |

Figure 10

Recommendations based on file server directory access:

SYSTEMS AND METHODS FOR ASSISTING USERS WITH CONTACT, ACCESS, AND DISTRIBUTION LISTS

TECHNICAL FIELD

The disclosed implementations relate generally to contact lists, email distribution lists, and network access privileges, and methods to facilitate management of those lists.

BACKGROUND

Advanced computer-mediated communication (CMC) technologies, like social networking applications, video conferencing, instant chat, and others, are ubiquitous in the modern workplace. The emerging technologies are designed to enable workers to engage at the moment it's conductive, using a medium that best meets the needs of the collaboration. This model typically requires workers to maintain contact lists, distribution lists, access lists, and so on. Managing these lists is tedious, but can be manageable for small working groups. However, as the technology expands to larger enterprises, the management overhead is excessive.

SUMMARY

Disclosed implementations of the present invention address these problems of managing worker group lists. Disclosed systems monitor existing communication channels to identify de facto groups, and the level of usage for those de facto groups. The data comes from email, file server access, shared calendar data, phone logs, or presence and proximity data. The information about de facto groups is then compared to the existing groups, and the system makes recommendations to the user. For example, in some implementations, the system recommends adding new groups, removing existing groups, or modifying existing groups in order to conform more closely to the groupings that are actually being used. In some implementations where a user has access to presence data for colleagues, the user can select a group, and thereby more quickly identify individuals within the group to obtain presence or other status information. In addition, different groups may have different levels of access to a user's presence or awareness data. In some implementations, the system recommends different file access permissions based on group activity. For example, in a group that is very active, it may be more efficient to grant all of the users in the group full access to certain network files at all times. Finally, some implementations utilize group usage to order the groups when presented in a graphical user interface. For example, a user may have a larger number of email distribution lists, so some implementations sort the groups by decreasing usage. This enables users to quickly identify appropriate distribution lists in many cases.

Groupings of workers are dynamic, so any fixed set of groups starts becoming obsolete as soon as the groups are created. Implementations of the present invention address this issue by periodically gathering more data, and weighting the new data more heavily than older data (e.g., using an exponential decay function). In some implementations, new data is collected weekly, and new recommendations based on that data is presented to users shortly thereafter. In this way, users can easily manage their contact lists, distribution lists, etc., without an excessive burden.

Unlike algorithms that construct groups based on clustering or pairing, disclosed implementations model groups directly, and correctly recognize that a user can be a member of many distinct groups simultaneously. For example, a user A may be working on one project with coworkers B and C, working on another project with coworkers D, E, an F, and may be on an office committee with coworkers E, G, and H. In this instance, groups {A, B, C}, {A, D, E, F}, and {A, E, G, H} are all independently meaningful. Even though user A works with all of these coworkers extensively, {A, B, C, D, E, F, G, H} would not be a useful group.

According to some implementations, a method of managing contact groups is performed at a server having one or more processors and memory. The server receives email header information for a plurality of electronic messages that were sent during a designated period of time. The email header information for an electronic message includes a unique identifier of the sender, and a unique identifier for each recipient of the electronic message. The server builds a set of de facto groups using the received email header information. Each de facto group consists of a set containing the unique identifiers corresponding to the sender and recipients of an electronic message for which email header information was received. For each respective de facto group, the server computes a respective usage value based on the number of distinct electronic messages corresponding to the respective de facto group. An electronic message corresponds to a de facto group when the set of unique identifiers corresponding to the sender and recipients of the electronic message is equal to the de facto group. The server stores each de facto group and corresponding usage value in the memory, and identifies a set of saved groups. Each saved group consists of a set of unique identifiers of people, and each saved group has a usage value. The respective usage value is zero when the respective saved group does not equal any de facto group; when the respective saved group equals a corresponding de facto group, the usage value of the saved group equals the usage value of the corresponding de facto group. The server compares the de facto groups and associated usage values to the saved groups and their associated usage values and provides a recommendation to modify the set of saved groups based on the comparisons. In some implementations, the recommendation is displayed in a user interface on a client device. In some of these implementations, the user accepts the recommendation to modify the set of saved groups, selects one of the saved groups, and receives and views current status information from the server for the people in the selected saved group.

In some implementations, the information to compute de facto groups and their usage values includes data from file access events. In these implementations, the server receives information regarding user access events to files in shared directories during the designated period of time. The information for each user access event includes a unique user identifier and a unique directory identifier. The server builds a set of de facto file groups, where each respective de facto file group corresponds to a respective directory. The de facto file groups include the unique user identifiers for each user who accessed one or more files in the respective directory during the designated period of time. For each respective de facto file group, the server computes a respective usage value based on the user access events to files in the respective directory. The server then merges the de facto file groups into the de facto groups. When a respective de facto file group equals a de facto group, the server modifies the usage value of the respective de facto group based on the usage value of the respective de facto file group.

Implementations support different types of recommendations. In some instances, the recommendation is to remove a saved group when the usage value of the saved group is below a renewal threshold. In some instances, the recommendation is to replace a saved group G with a de facto group G' when saved group G is a proper subset of de facto group G' and the usage value of G' minus the usage value of G exceeds a superset replacement threshold. In some instances, the recommendation is to replace a saved group G with a de facto group G" when de facto group G" is a proper subset of saved group G and the usage value of G" minus the usage value of G exceeds a subset replacement threshold. In some instances, the recommendation is to save de facto group $G_N$ as a new saved group when the usage value of de facto group $G_N$ exceeds an insert threshold, $G_N$ is not equal to any saved group, and $G_N$ is not recommended as a replacement for any saved group.

BRIEF DESCRIPTION OF THE DRAWINGS

FIG. 9 illustrates a portion of a root directory on a network file server in accordance with some implementations.

FIG. 10 illustrates a portion of a file access log in accordance with some implementations.

Like reference numerals refer to corresponding parts throughout the drawings.

DESCRIPTION OF IMPLEMENTATIONS

Figure 1:
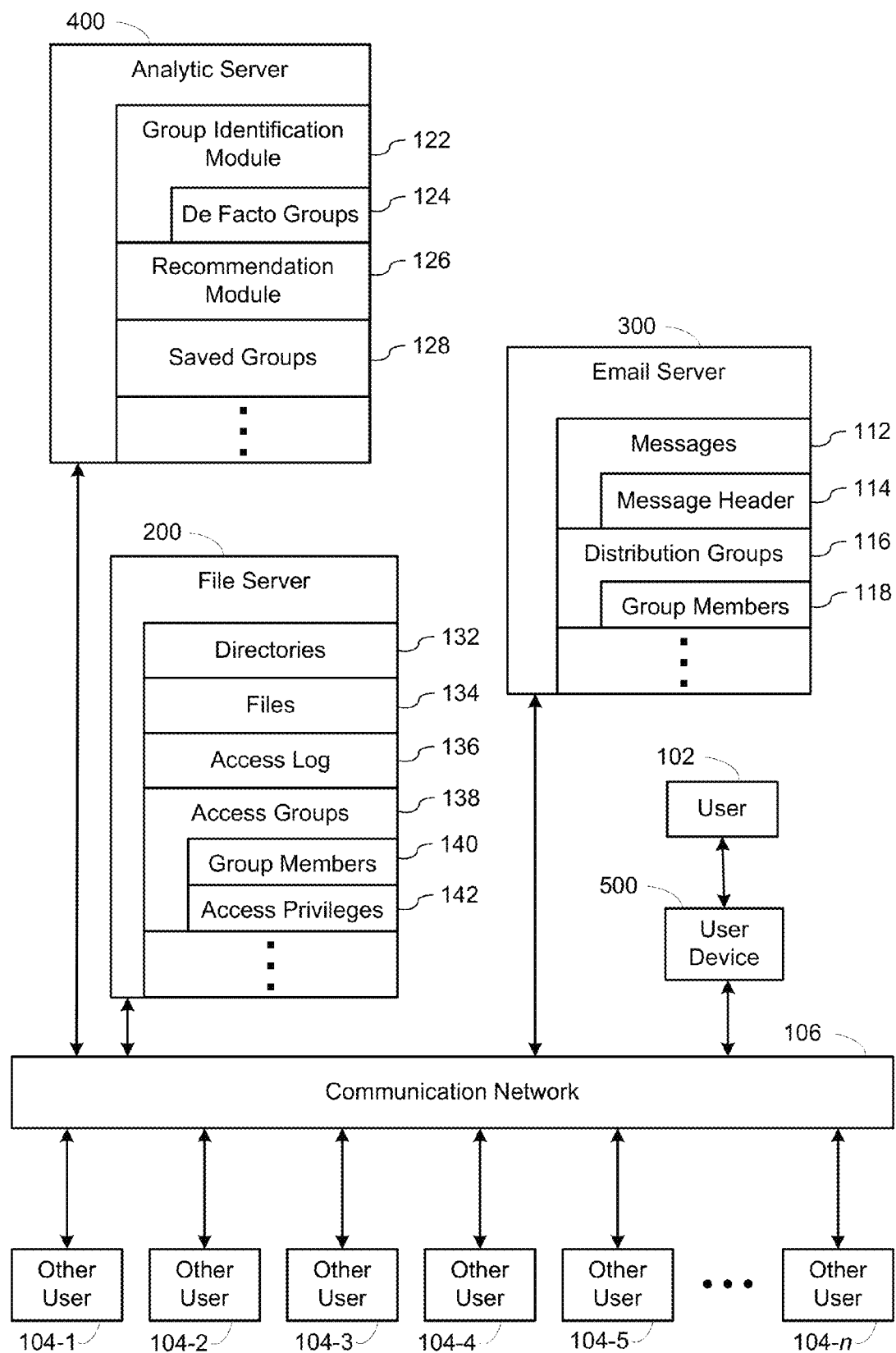
FIG. 1 illustrates the context in which some implementations of the present invention operate.

FIG. 1 illustrates the context in which implementations of the present invention operate. A user 102 utilizes a user device 500 to communicate over a communication network 106 with an email server 300. An email client may be resident on the user device 500, or the user may access email using a web application provided by the email server or web server. FIG. 1 illustrates a limited portion of email server 300, including email messages 112 and distribution groups 116. As illustrated here, each email message 112 includes a header 114, which is more fully described below in FIG. 6. Each distribution group 116 consists of a set of group members 118. There is a many-to-many relationship between groups and group members. In some implementations, the members of each group are all "equal," but some implementations support groups in which members can have different roles. For example, in an email distribution list, some implementations enable distinguishing between users who will appear on the "To" list versus "CC list" versus "BCC list."

Also communicating over the communication network are other users 104, such as other user 104-1 to 104-n, using their own user devices 500. Like user 102, the other users 104 can send and receive email over the communication network, and can access files 134 and directories 132 on file servers 200. A portion of a file server directory structure is illustrated in FIG. 9 below. In some implementations, certain access operations are logged in an access log 136. For example, in some implementations, logged operations include creating, editing, or deleting a file, renaming a file, and moving a file to a different location. A portion of a log access file is illustrated in FIG. 10 below.

In some implementations, a file server maintains access groups 138. An access group 138 has a set of group members 140 as well as a set of access privileges 142 for the group members. The access privileges 142 can specify what operations are allowed, when access is allowed (e.g., regular business hours versus any time), and so on.

An analytic server 400 extracts information about email messages 112 and/or file access in order to identify de facto groups 124 as part of a group identification module 122. In some implementations, the module 122 extracts email messages 112 from the email server 300, and thus extracts messages from all users at the same time. In alternative implementations, the group identification module 122 in the analytic server extracts email messages from individual user devices 500. Although generally less efficient, some implementations enable email extraction from individual user devices 500 when the messages are not stored at a central email server 300. The group identification module 122 also builds de facto groups using information from one or more file access logs 136 on one or more file servers 200. The process of extracting data to form de facto groups and identifying a usage level for each group is described in greater detail below with respect to FIGS. 6-11.

The analytic server 400 also includes a recommendation module 126 that recommends certain group actions based on the de facto groups and their usage levels. For example, the recommendation module 126 can recommend adding, removing, or modifying the set of saved groups 128. The recommendation module 126 is described in greater detail below in FIGS. 12-15.

Figure 2:
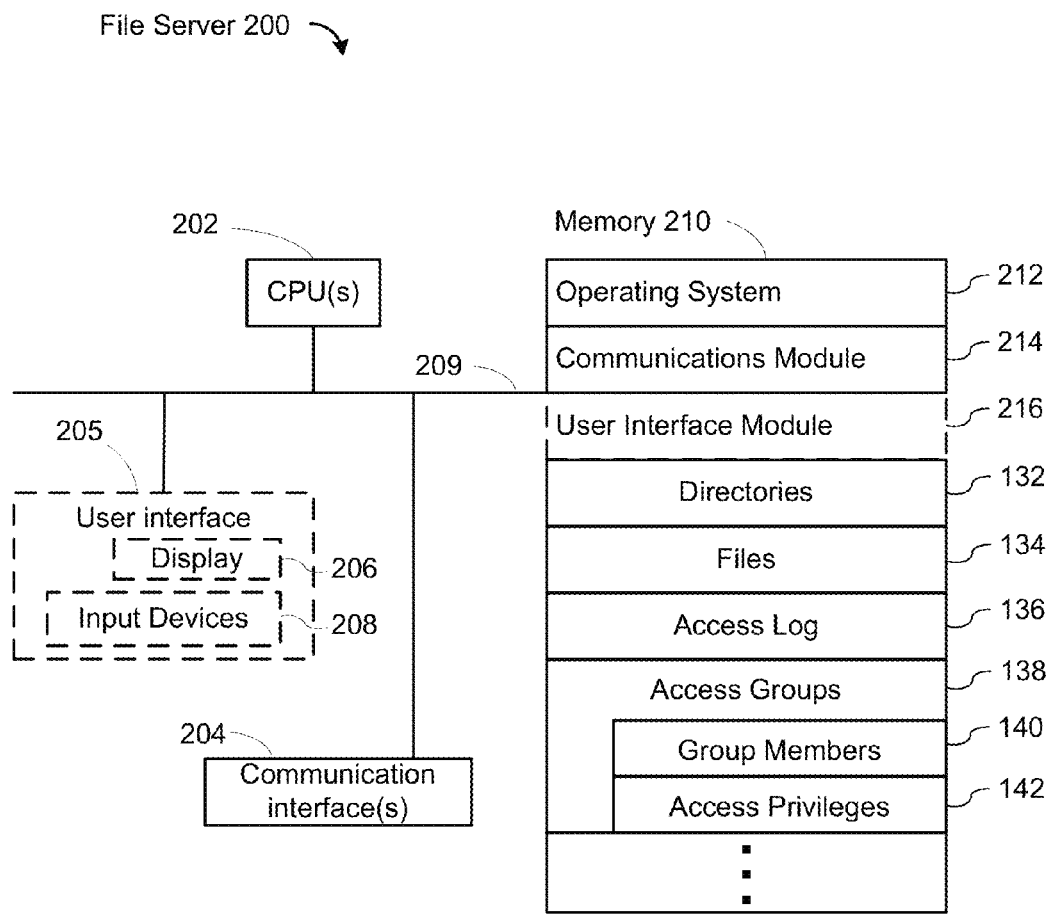
FIG. 2 is a block diagram illustrating a file server in accordance with some implementations.

FIG. 2 is a block diagram illustrating a file server 200, according to some implementations. The file server 200 typically includes one or more processing units (CPU's) 202, one or more network or other communications interfaces 204, memory 210, and one or more communication buses 209 for interconnecting these components. The communication buses 209 may include circuitry (sometimes called a chipset) that interconnects and controls communications between system components. The file server 200 optionally may include a user interface 205 comprising a display device 206 and input devices 208 (e.g., keyboard, mouse, touch screen, keypads, etc.). Memory 210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 210 may optionally include one or more storage devices remotely located from the CPU(s) 202. Memory 210, or alternately the non-volatile memory device(s) within memory 210, comprises a computer readable storage medium. In some implementations, memory 210 stores the following programs, modules, and data structures, or a subset thereof:

- an operating system 212 that includes procedures for handling various basic system services and for performing hardware dependent tasks;
- a communication module 214 that is used for connecting the file server 200 to other computers via the one or more communication interfaces 204 (wired or wireless) and one or more communication networks 106, such as the Internet, other wide area networks, local area networks, metropolitan area networks, and so on;
- an optional user interface module 216 that receives commands from the user via the input devices 208 and generates user interface objects in the display device 206;
- directories 132, which form a hierarchical structure for storing files;
- files 134, which can be stored in any format;
- an access log 136, which stores information about certain file access operations. In some implementations, the operations include creating, deleting, or modifying a file, as well as renaming or moving a file. The access log includes an identifier of who performed the operation, an identifier of the directory (e.g., the full path name), and identifier of the file (e.g., the file name), as well as a timestamp of when the operation occurred, as illustrated in FIG. 10;
- access groups 138, each of which identifies a set of group members 140 (i.e., users) as well as a set of access privileges 142.

Each of the above identified elements may be stored in one or more of the previously mentioned memory devices, and corresponds to a set of instructions for performing a function described above. The set of instructions can be executed by one or more processors (e.g., the CPUs 202). The above identified modules or programs (i.e., sets of instructions) need not be implemented as separate software programs, procedures or modules, and thus various subsets of these modules may be combined or otherwise re-arranged in various implementations. In some implementations, memory 210 may store a subset of the modules and data structures identified above. Furthermore, memory 210 may store additional modules and data structures not described above.

Although FIG. 2 shows a file server 200, FIG. 2 is intended more as a functional description of the various features that may be present in a set of servers than as a structural schematic of the implementations described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers used to implement a file server 200 and how features are allocated among them will vary from one implementation to another, and may depend in part on the amount of data traffic that the system must handle during peak usage periods as well as during average usage periods.

Figure 3:
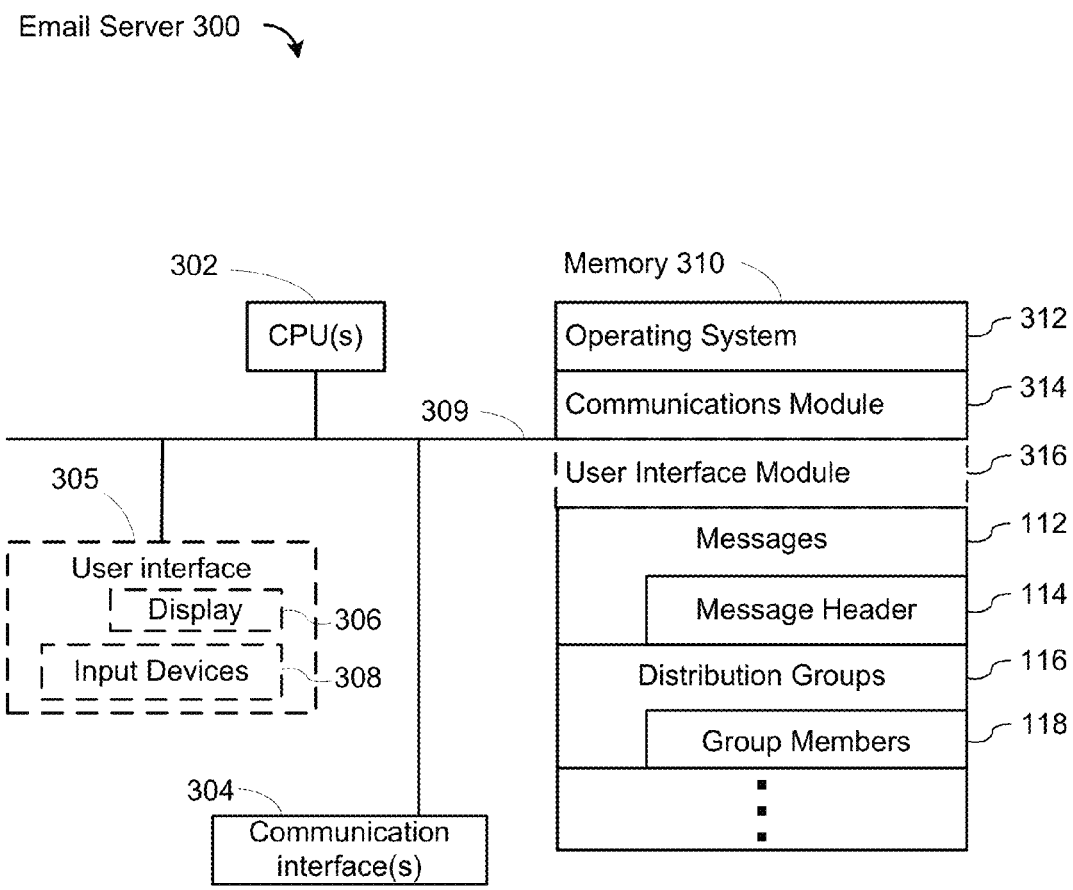
FIG. 3 is a block diagram illustrating an email server in accordance with some implementations.
Figure 6:
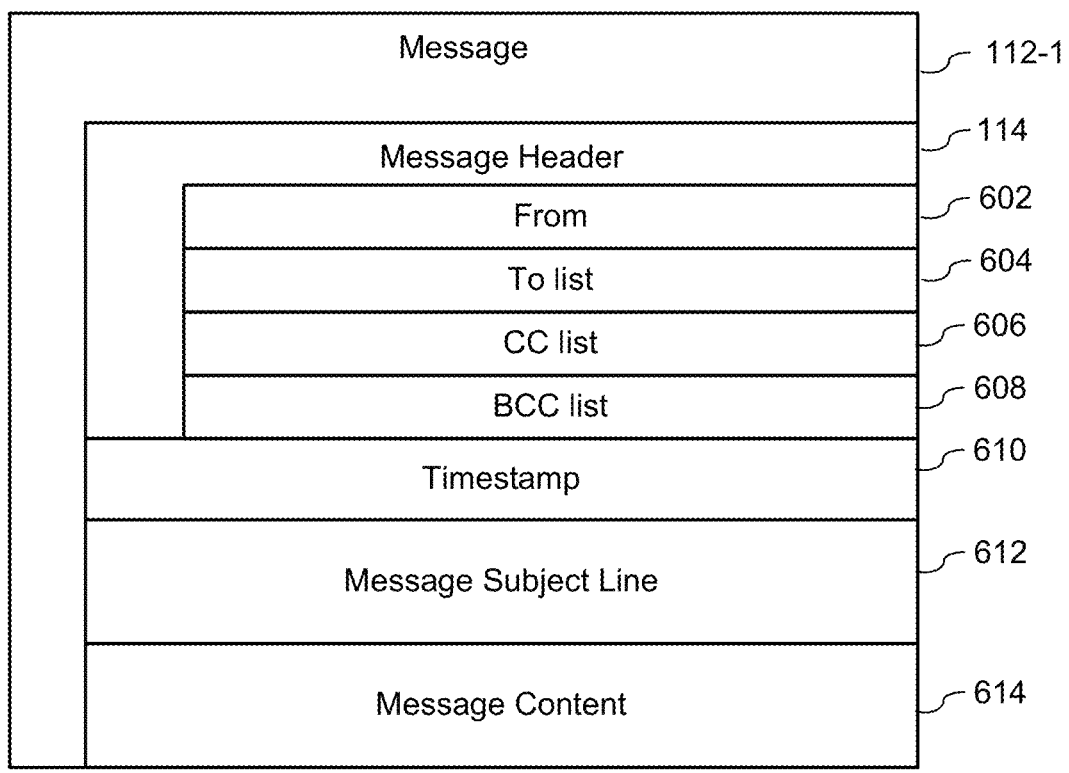
FIG. 6 illustrates the elements of an email message in accordance with some implementations.

FIG. 3 is a block diagram illustrating an email server 300, according to some implementations. The email server 300 typically includes one or more processing units (CPU's) 302, one or more network or other communications interfaces 304, memory 310, and one or more communication buses 309 for interconnecting these components. The communication buses 309 may include circuitry (sometimes called a chipset) that interconnects and controls communications between system components. The email server 300 optionally may include a user interface 305 comprising a display device 306 and input devices 308 (e.g., keyboard, mouse, touch screen, keypads, etc.). Memory 310 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 310 may optionally include one or more storage devices remotely located from the CPU(s) 302. Memory 310, or alternately the non-volatile memory device(s) within memory 310, comprises a computer readable storage medium. In some implementations, memory 310 stores the following programs, modules, and data structures, or a subset thereof:

- an operating system 312 that includes procedures for handling various basic system services and for performing hardware dependent tasks;
- a communication module 314 that is used for connecting the email server 300 to other computers via the one or more communication interfaces 304 (wired or wireless) and one or more communication networks 106, such as the Internet, other wide area networks, local area networks, metropolitan area networks, and so on;
- an optional user interface module 316 that receives commands from the user via the input devices 308 and generates user interface objects in the display device 306;
- email messages 112, which are described in more detail below in FIG. 6. Each email message 112 has a message header 114, which identifies the sender and recipients of the message 112;
- one or more distribution groups or contact lists 116. Each group or list includes a set of group members 118, and in some implementations identifies roles for one or more of the group members.

Each of the above identified elements may be stored in one or more of the previously mentioned memory devices, and corresponds to a set of instructions for performing a function described above. The set of instructions can be executed by one or more processors (e.g., the CPUs 302). The above identified modules or programs (i.e., sets of instructions) need not be implemented as separate software programs, procedures or modules, and thus various subsets of these modules may be combined or otherwise re-arranged in various implementations. In some implementations, memory 310 may store a subset of the modules and data structures identified above. Furthermore, memory 310 may store additional modules and data structures not described above.

Although FIG. 3 shows an email server 300, FIG. 3 is intended more as a functional description of the various features that may be present in a set of servers than as a structural schematic of the implementations described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement an email server 300 and how features are allocated among them will vary from one implementation to another, and may depend in part on the amount of data traffic that the system must handle during peak usage periods as well as during average usage periods.

Figure 4:
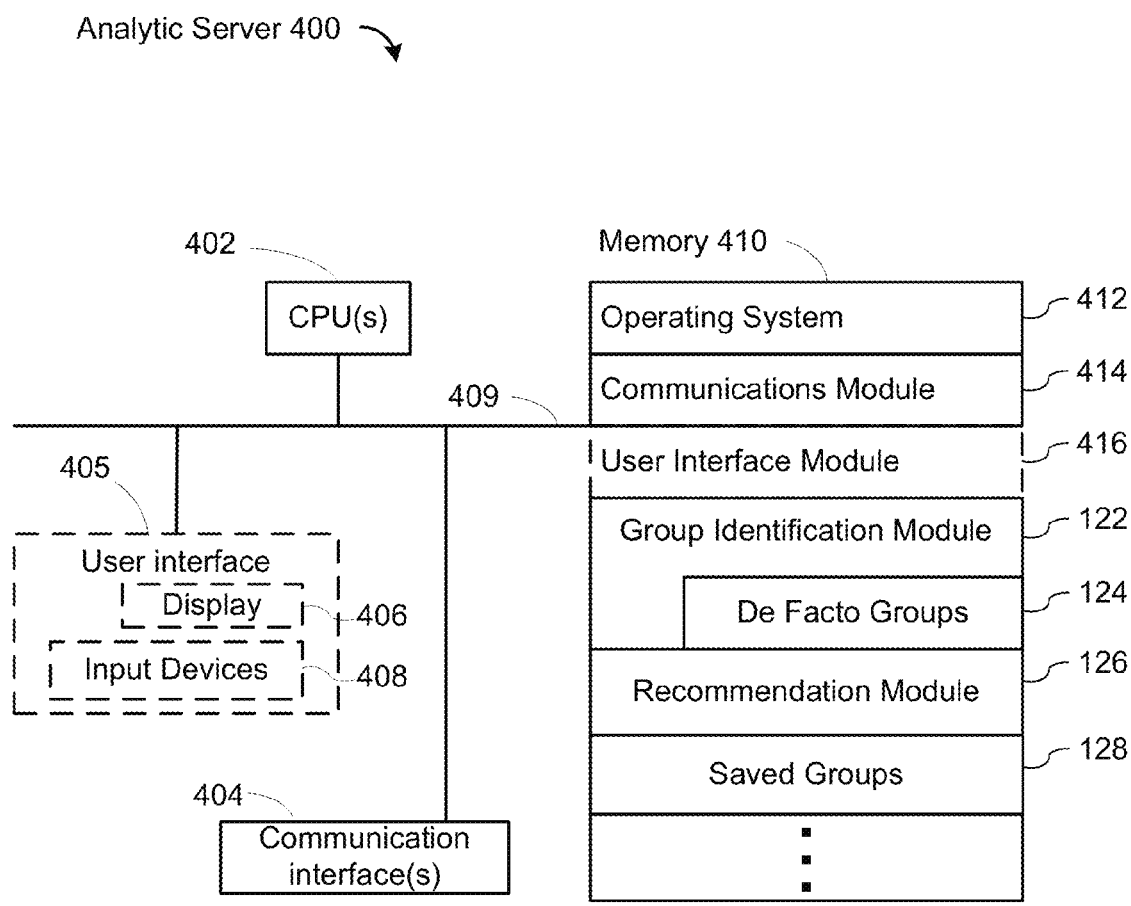
FIG. 4 is a block diagram illustrating an analytic server in accordance with some implementations.

FIG. 4 is a block diagram illustrating a analytic server 400, according to some implementations. The analytic server 400 typically includes one or more processing units (CPU's) 402, one or more network or other communications interfaces 404, memory 410, and one or more communication buses 409 for interconnecting these components. The communication buses 409 may include circuitry (sometimes called a chipset) that interconnects and controls communications between system components. The analytic server 400 optionally may include a user interface 405 comprising a display device 406 and input devices 408 (e.g., keyboard, mouse, touch screen, keypads, etc.). Memory 410 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 410 may optionally include one or more storage devices remotely located from the CPU(s) 402. Memory 410, or alternately the non-volatile memory device(s) within memory 410, comprises a computer readable storage medium. In some implementations, memory 410 stores the following programs, modules, and data structures, or a subset thereof:

- an operating system 412 that includes procedures for handling various basic system services and for performing hardware dependent tasks;
- a communication module 414 that is used for connecting the analytic server 400 to other computers via the one or more communication interfaces 404 (wired or wireless) and one or more communication networks 106, such as the Internet, other wide area networks, local area networks, metropolitan area networks, and so on;
- an optional user interface module 416 that receives commands from the user via the input devices 408 and generates user interface objects in the display device 406;
- a group identification module 122, which extracts information from email messages 122 and file server access logs 136 to identify de facto groups 124 of users. This is described in more detail below with respect to FIGS. 6-11;
- a recommendation module 126, which issues recommendations to a user regarding the composition of groups (e.g., distribution groups 116 and/or access groups 138), or recommendations about access privileges 142. In some implementations, the recommendation module 126 identifies a sort order for the groups when the groups are displayed in a user interface. The recommendation process is described in more detail below with respect to FIGS. 12-15 and portions of FIGS. 18A-18E. The recommendation module 126 compares the de facto groups 124 and their usage levels to the existing saved groups 128 and their usage levels. For example, if a de facto group 124 with high usage is not already a saved group 128, the recommendation module may recommend adding the de facto group 124 as a saved group 128 or replacing an existing group 128 that is similar to the de facto group 124.

Each of the above identified elements may be stored in one or more of the previously mentioned memory devices, and corresponds to a set of instructions for performing a function described above. The set of instructions can be executed by one or more processors (e.g., the CPUs 402). The above identified modules or programs (i.e., sets of instructions) need not be implemented as separate software programs, procedures or modules, and thus various subsets of these modules may be combined or otherwise re-arranged in various implementations. In some implementations, memory 410 may store a subset of the modules and data structures identified above. Furthermore, memory 410 may store additional modules and data structures not described above.

Although FIG. 4 shows an analytic server 400, FIG. 4 is intended more as a functional description of the various features that may be present in a set of servers than as a structural schematic of the implementations described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement an analytic server 400 and how features are allocated among them will vary from one implementation to another, and may depend in part on the amount of data traffic that the system must handle during peak usage periods as well as during average usage periods.

Figure 5:
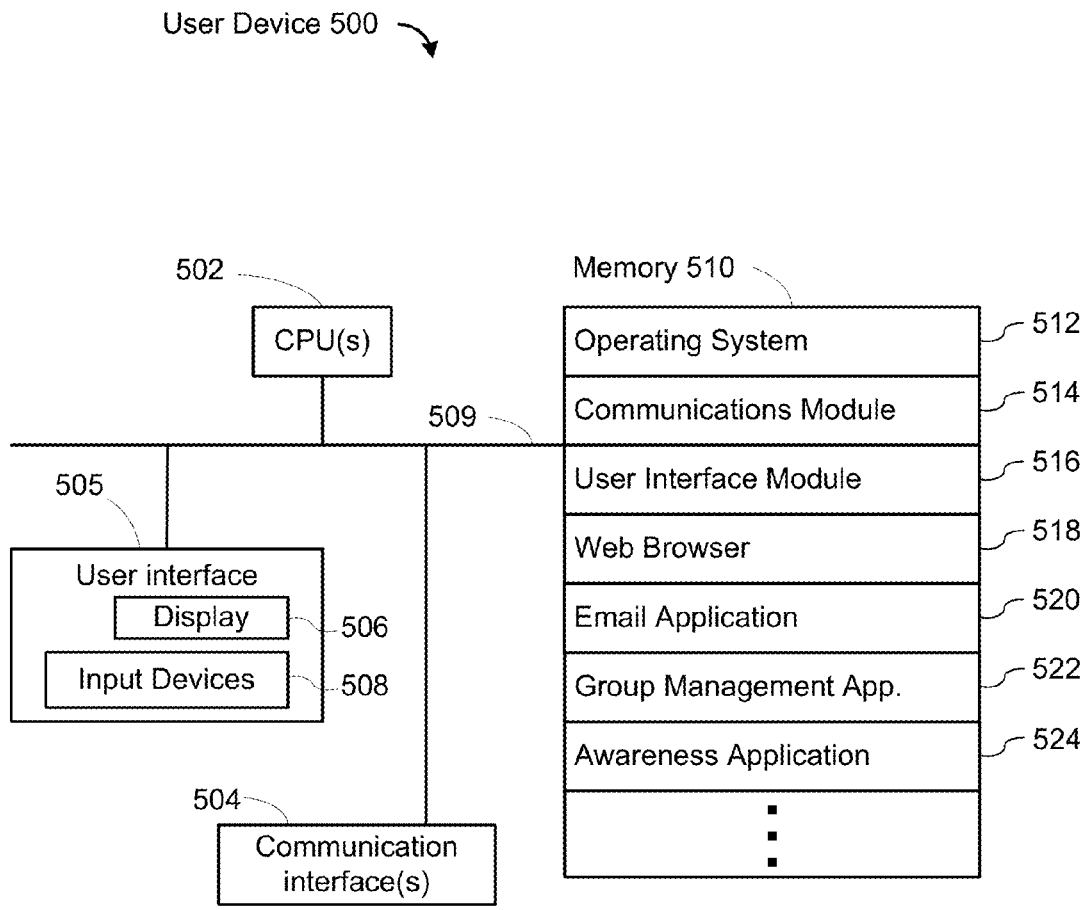
FIG. 5 is a block diagram illustrating a user device in accordance with some implementations.

FIG. 5 is a block diagram illustrating a user device 500, according to some implementations. The user device 300 can be a desktop computer, laptop computer, a Smart Phone, or other mobile device that can connect to other computing devices over a communication network 106. The user device 500 typically includes one or more processing units (CPU's) 502, one or more network or other communications interfaces 504, memory 510, and one or more communication buses 509 for interconnecting these components. The communication buses 509 may include circuitry (sometimes called a chipset) that interconnects and controls communications between system components. The user device 500 also includes a user interface 505 comprising a display device 506 and input devices 508 (e.g., keyboard, mouse, touch screen, keypads, etc.). Memory 510 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 510 may optionally include one or more storage devices remotely located from the CPU(s) 502. Memory 510, or alternately the non-volatile memory device(s) within memory 510, comprises a computer readable storage medium. In some implementations, memory 510 stores the following programs, modules and data structures, or a subset thereof:

- an operating system 512 that includes procedures for handling various basic system services and for performing hardware dependent tasks;
- a communication module 514 that is used for connecting the user device 500 to other computer systems via the one or more communication interfaces 504 (wired or wireless) and one or more communication networks 106, such as the Internet, other wide area networks, local area networks, metropolitan area networks, and so on;
- a user interface module 516 that receives commands from the user via the input devices 508 and generates user interface objects in the display device 506;
- a web browser 518 that enables a user to access to access resources, web pages, and web applications over a communication network;

an email application 520 that enables a user to compose, send, and receive email messages. In some implementations, the email application 520 executes within the web browser 518;

a group management application 522, which enables a user to create, modify, or remove distribution groups or contact lists, and provides recommendations to the user received from the analytic server 400. The user can choose to accept, reject, or modify the recommendations from analytic server. In some implementations, the group management application 522 provides feedback to the analytic server 400 based on the actions the user takes. For example, if the user 102 rejects a recommendation, the analytic server 400 can track that rejection so that the analytic server 400 does not make the same recommendation next week; and an awareness application 524, which enables a user 102 to view current status information about colleagues. For example, the myUnity application provided by Fuji Xerox enables users to quickly discover which colleagues are in the office, available through other communication channels (e.g., instant messaging), and so on. Some implementations include groupings of colleagues, and thus can take advantage of the grouping recommendations of the present disclosure. Of course the present disclosure may be utilized in other presence/awareness applications, and can be used in other social networks in addition to a workplace.

Each of the above identified elements may be stored in one or more of the previously mentioned memory devices, and corresponds to a set of instructions for performing a function described above. The set of instructions can be executed by one or more processors (e.g., the CPUs 502). The above identified modules or programs (i.e., sets of instructions) need not be implemented as separate software programs, procedures or modules, and thus various subsets of these modules may be combined or otherwise re-arranged in various implementations. In some implementations, memory 510 may store a subset of the modules and data structures identified above. Furthermore, memory 510 may store additional modules and data structures not described above.

Although FIG. 5 shows a user device 500, FIG. 5 is intended more as a functional description of the various features which may be present in a user device than as a structural schematic of the implementations described herein. In practice, and as recognized by those of ordinary skill in the art, items shown separately could be combined and some items could be separated.

Each of the methods described herein may be governed by instructions that are stored in a computer readable storage medium and that are executed by one or more processors of one or more servers 200, 300, or 400 or user devices 500. Each of the operations shown in FIGS. 1-5, 7, 8, 11-13, 17, and 18A-18E may correspond to instructions stored in a computer memory or computer readable storage medium.

FIG. 6 illustrates the basic elements of an email message 112-1 in accordance with some implementations. The message 112-1 includes a message header 114, which identifies the sender 602 and recipients of the message. Whereas a message 112-1 has a single unique sender 602, there can be up to three distinct class of recipients, as is known in the art. The "TO" list 604 identifies the primary recipients of the message 112-1, which can specify zero or more email addresses or user identifiers. The "CC" (carbon copy) list 606 identifies a list of secondary recipients, which includes zero or more email addresses or user identifiers. Some implementations also include a "BCC" (blind carbon copy) list 608, which identifies zero or more recipients who will receive the message, but whose identities will not be seen by any of the other recipients.

An email message 112-1 also includes one or more timestamps 610, which specify when the message was sent or received. Generally, implementations use the timestamp of when a message was sent, when email systems track that information. In some implementations, the timestamps 610 are included in the header 114.

An email message 112-1 also includes a subject line 612, and the actual content 614. Typically, the sender includes a short description of the message 112-1 in the subject line 612, but many email servers 300 do not require subject lines. The content 614 of a message 112-1 can include text, graphics, attachments, etc.

Figure 7:
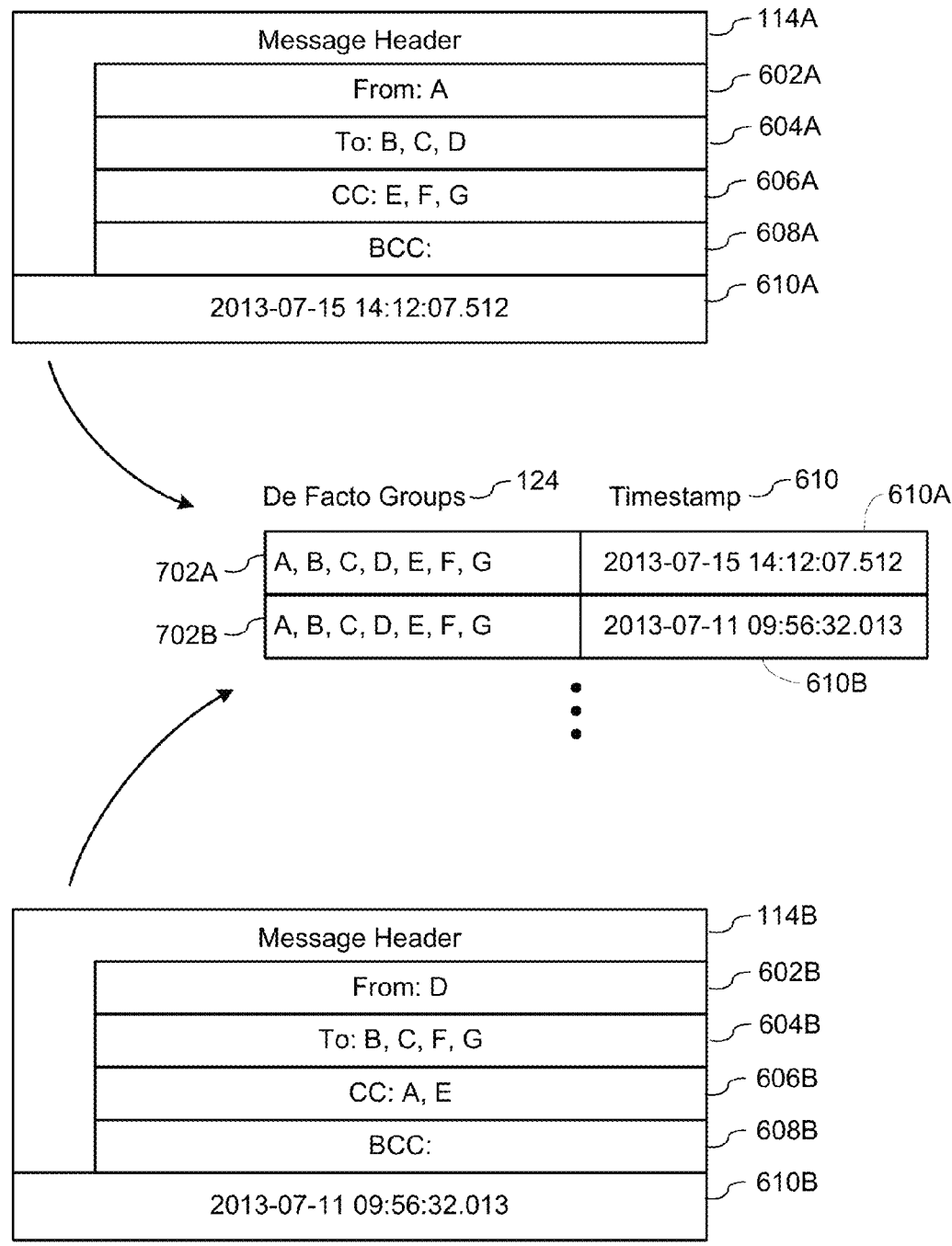
FIG. 7 illustrates a process of extracting de facto groups from email messages in accordance with some implementations.

The analytic server 400 retrieves a limited portion of email messages 112, and generally does not include the subject line 612 or the message content 614. FIG. 7 illustrates the extraction of two email message headers 114A and 114B. In these examples, the BCC fields 608A and 608B are empty, so they do not contribute to identified groupings. Although the two message headers 114A and 114B are different (none of the lists 602A, 604A, or 606A match the corresponding list 602B, 604B, or 606B), they both produce the same de facto group {A, B, C, D, E, F, G} because each of the members of the group appears in one of the lists. Corresponding to header 114A is a first group instance 702A, with associated timestamp 2013-07-15 14:12:07.512 (610A). One of skill in the art recognizes that a timestamp can be saved in many different formats. The second group instance 702B identifies the same group, but has a different timestamp 610B.

Figure 8:
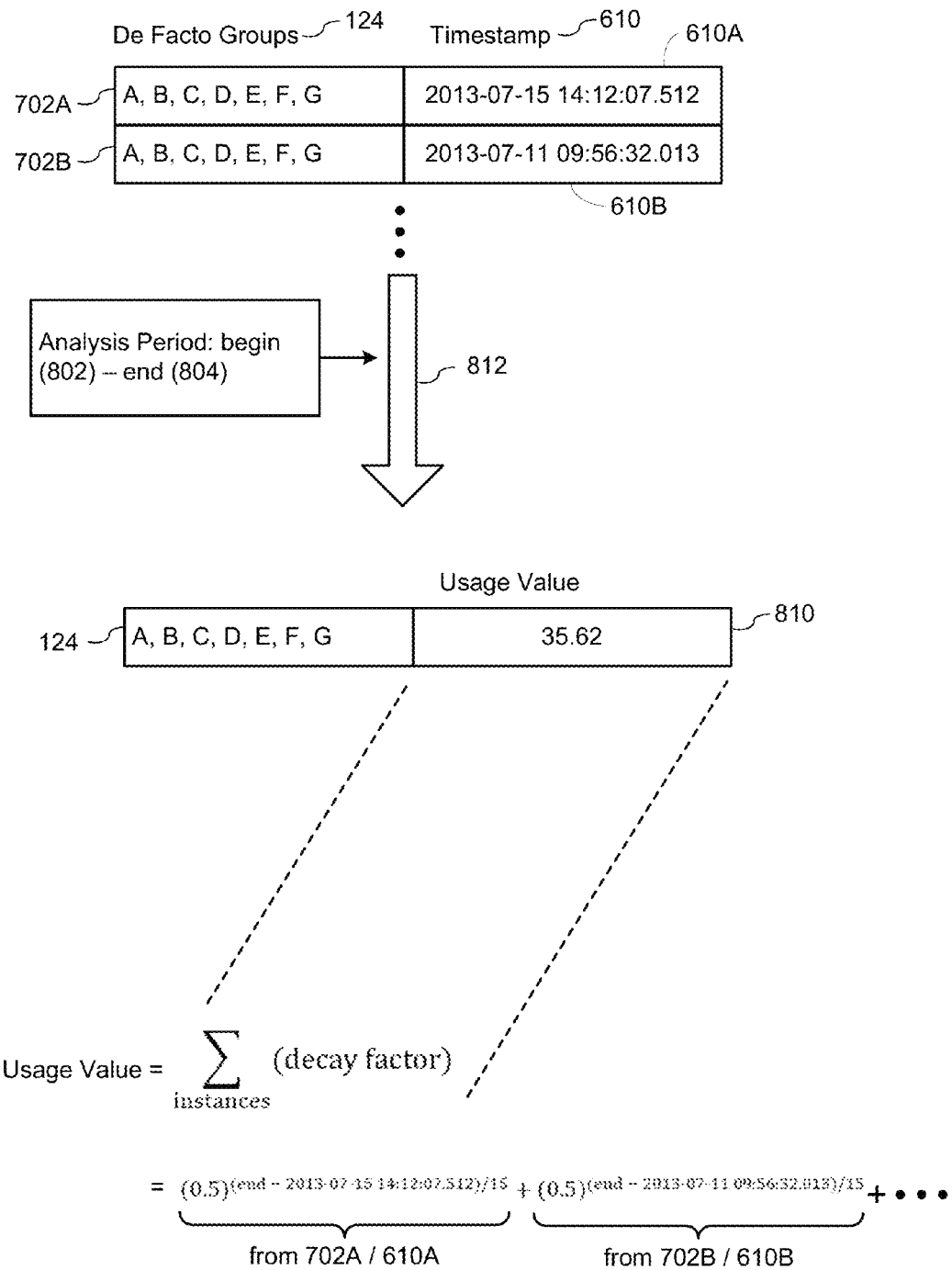
FIG. 8 illustrates a process of assigning a usage value to a group in accordance with some implementations.

FIG. 8 illustrates a process of assigning (812) a usage value/level to each of the de facto groups. In some implementations, the usage value is just the sum of the number of instances where a group appeared. If instances 702A and 702B were the only instances for group {A, B, C, D, E, F, G}, then the usage value would be 2.

In other implementations, the usage value 810 is computed with a weighting factor based on how recently the message was sent. In these implementations, an analysis period is selected (e.g., from some starting point 802 to an ending point 804), and the weight of each instance is based on the difference between the ending point of the analysis period and the timestamp of each instance. In some implementations, the beginning point 802 is optional. When specified, only messages on or after the beginning time are included in the calculations; otherwise, all messages are included in the calculation.

In the example in FIG. 8, the usage value 810 is 35.62, which represents the sum of many instances. In some implementations, the weighting or decay factor is selected so that timestamps exactly at the end time result in a weighting of 1, and timestamps that are 15 days old result in a weighting of 0.5 (the relevance half-life is 15 days).

The same calculations are performed for each of the de facto groups 124, and thus each de facto group has an associated usage value that indicates how useful the group is currently. If calculations are done weekly, then spikes in usage of any group are detected in no more than a week. The time period could be made shorter (e.g., one day), but short periods can result in creating short-term groups that do not have long-term utility for users.

Once a usage value has been assigned to each of the de facto groups 124, it also provides usage values for each of the existing saved groups 128. If an existing group 128 does not show up as a de facto group 124 at all, then it was not used at all (usage=0.00); otherwise, the existing group 128 matches some de facto group 124, and the usage value of the de facto group 124 is the usage value of the existing group 128. This information will be used to assist the user, as described below in FIGS. 12-15.

Figure 11:
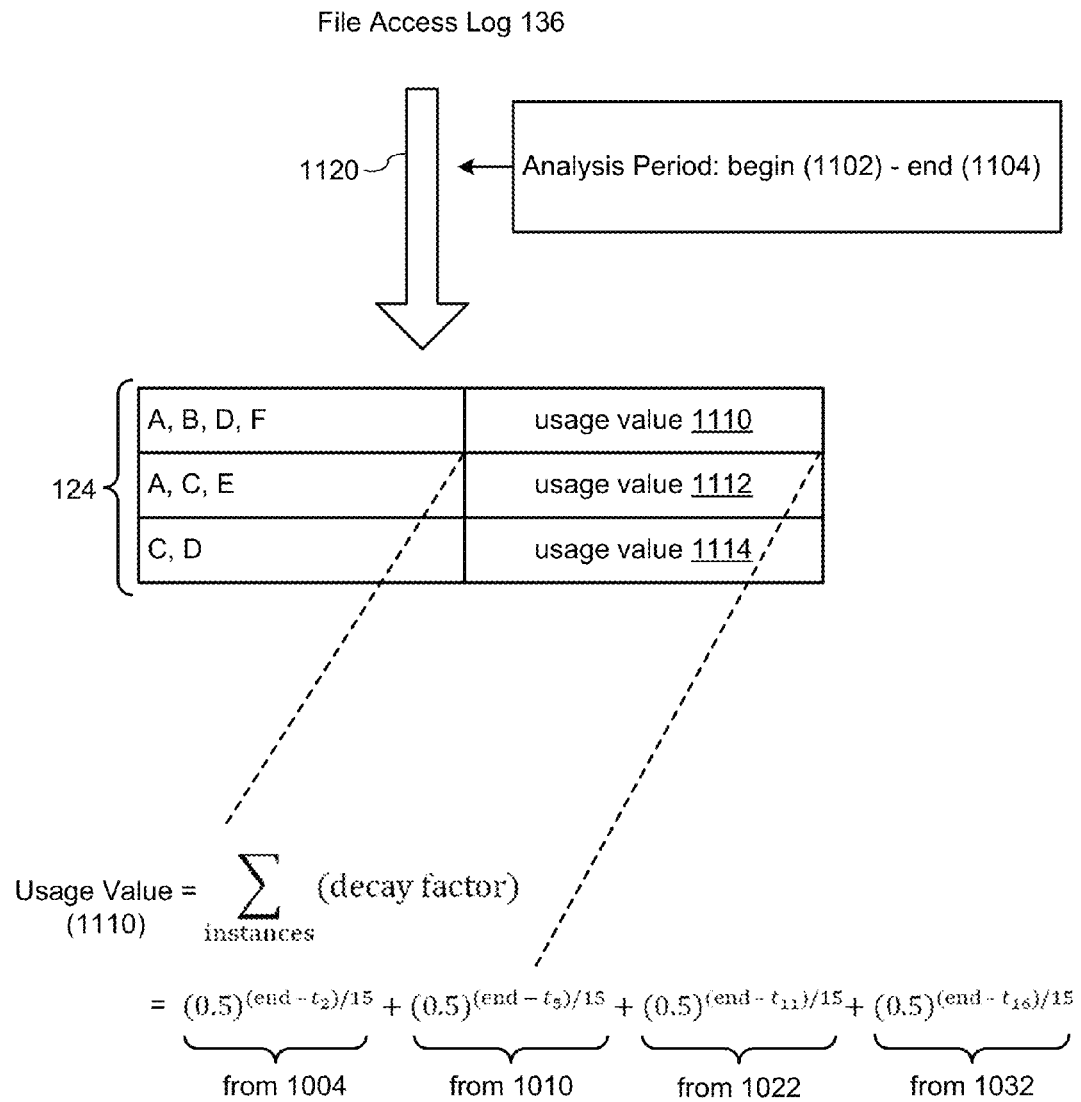
FIG. 11 illustrates building de facto groups and their usage levels from a file access log in accordance with some implementations.

FIGS. 9-11 illustrate a process of creating groups and usage levels based on network file server access. Files on a file server are generally organized in a logical hierarchy so that related files are grouped together. Therefore, workers who access files in the same directory are generally grouped in some way, such as a project. Based on empirical analysis, implementations commonly modify the grouping slightly to make the data more useful. First, sharing files in shallow directories may not indicate grouping. In particular, top level directories may be shared by lots of people, and not represent a relevant group, so some implementations ignore these directories. Some implementations include configurable directory selection so that users can select which directories to include and/or which directories to exclude. In the illustrated examples, the system is configured to exclude root directories and first level directories. Second, for directories that are too deep, the directory nesting can obscure an actual grouping. In some implementations, a nesting threshold is selected and all access to directories deeper than the threshold are considered to be at the threshold level. For example, in some implementations, file access of fifth level or deeper directories are considered to be at the fourth level. That is, only the first four directory levels are used to the analysis. This is the configuration selected in the illustrated examples.

Some implementations provide even greater flexibility to control how groups are computed based on file server access. Some implementations enable a user to select and/or exclude specific files, so that only access to the designated files is considered for forming groups of people. Some implementations enable a user to select and/or exclude specific directories, so that only certain designated directories are included in forming groups. As noted above, some implementations enable "collapsing" of certain file access based on the depth of the directory. Some implementations are even more flexible, allowing a user to have different collapsing rules for different directories or sets of directories.

FIG. 9 illustrates a small portion of a directory structure. Files 902-946 are stored at various levels in the hierarchy. FIG. 10 illustrates a portion of an access log 136 for the files listed in FIG. 9 for users A, B, C, D, E, F, and G. Each record in the access log 136 includes an identifier 1040 of the user, the directory 1042 accessed, the name of the file 1044, and a timestamp 1046 when the user accessed the file. As illustrated in records 1014 and 1016, a single user can access the same file multiple times, and in each case the access appears in the access log 136 with a different timestamp (e.g., $t_7$ and $t_8$). As shown in this sample access log 136, every one of the users has accessed a file in \root\subdir2 (records 1002, 1008, 1012, 1020, 1026, 1030, and 1034). In the illustrated implementations, these records are excluded because the system has been configured to ignore files in a first level directory.

The analytic server 400 uses the data in FIG. 10 to build (1120) three de facto groups 124. Just like with email headers 114, the analytic server 400 uses an analysis period in the building process (e.g., from a beginning date 1102 to and ending date 1104). De facto group {A, B, D, F} is based on records 1004, 1010, 1022, and 1032 in the access log, because in each of these cases a user accessed a file in \root\subdir1\subsubdir3. As shown in this example, the users need not access the same file. The accesses form a group as long as the files are in the same directory.

De facto group {A, C, E} is formed based on access log records 1006, 1014, 1016, and 1028. This grouping has only three group members. User C is only a single member of the de facto group, but the multiple access events 1014 and 1016 add to the usage value 1112 for this group. The illustrated implementation is configured to collapse all directories beyond the fourth level, so de facto group {C, D} is based on user access to different directories. User C accessed file13111 in a fourth level directory, as shown in record 1018. But user D accessed file131120 in a fifth level directory. By looking at only the first four levels, however, D and C accessed files from the same location, and thus {C, D} form a group, with usage value 1114.

Of course the actual usage value for each of the groups includes all of the instances of file access, and not just the small subset shown in FIG. 10. Like groups built from email headers, some implementations compute the usage value just by summing instances. Using this formula, the usage value 1110 for de facto group {A, B, D, F} is 4, the usage value 1112 for group {A, C, E} is 4, and the usage value 1114 for group {C, D} is 2.

Implementations typically compute the usage value with a decay weighting factor, as illustrated above for groups based on email headers. Choosing a weighting half-life of 15 days, FIG. 11 illustrates the usage value of the group {A, B, D, F} as the sum of the four corresponding weights.

The groups created for file server access (e.g., access groups 138) can be combined with email lists (e.g., distribution groups 116), or may be used independently. In some implementations, the file server access groups 138 are managed by a network administrator because individual users are not permitted to create groups or modify access privileges on network storage devices. This analysis with respect to network file server access can also be applied to document management systems and version control systems. In these systems, files are assigned to projects or other groupings, and thus the same principles apply.

Figure 17:
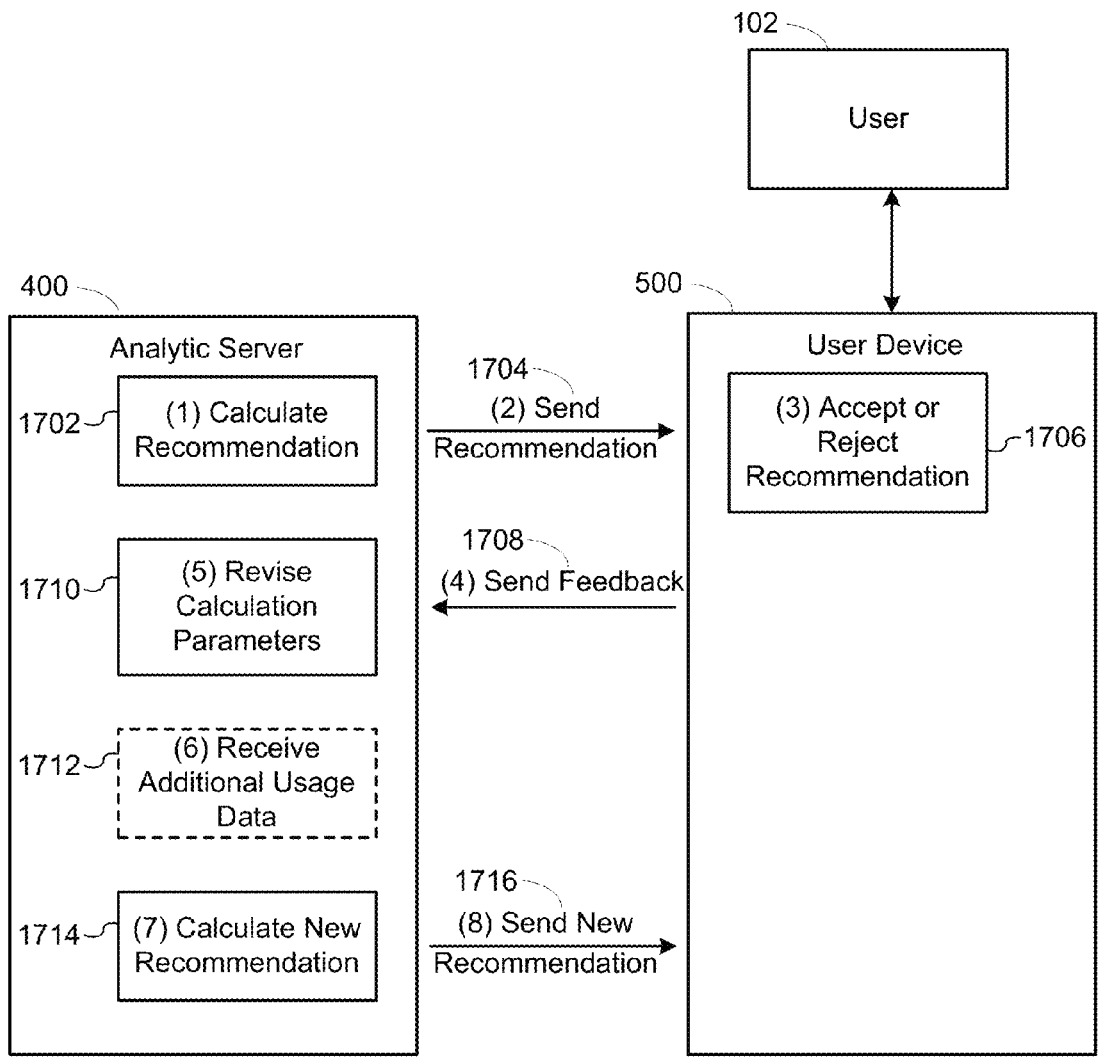
FIG. 17 illustrates how some implementations utilize feedback from users in order to provide better group recommendations in the future.
Figure 18A:
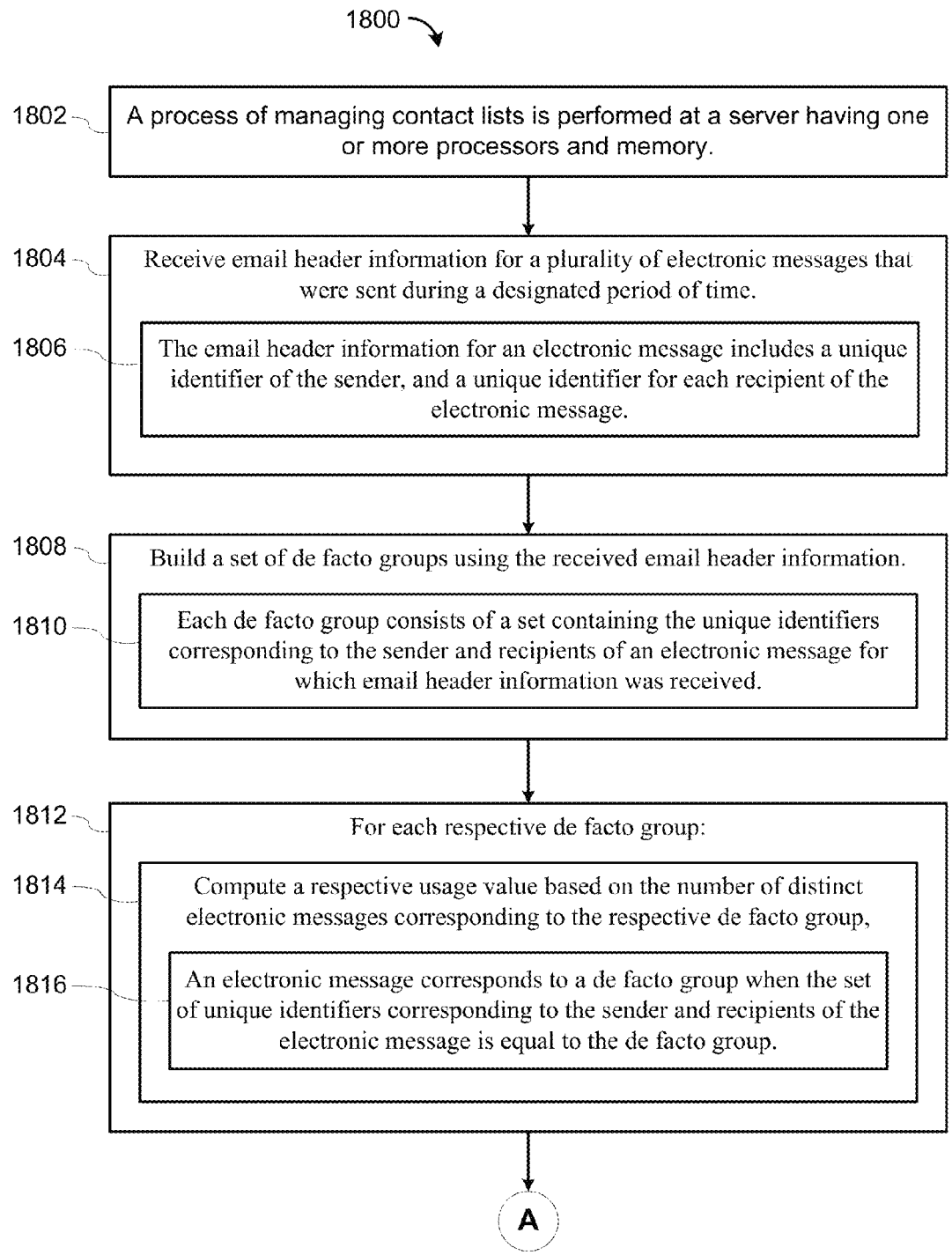
FIGS. 18A-18E illustrate a process of building groups of users, making recommendations based on those groups, and utilizing the groups in accordance with some implementations.
Figure 18B:
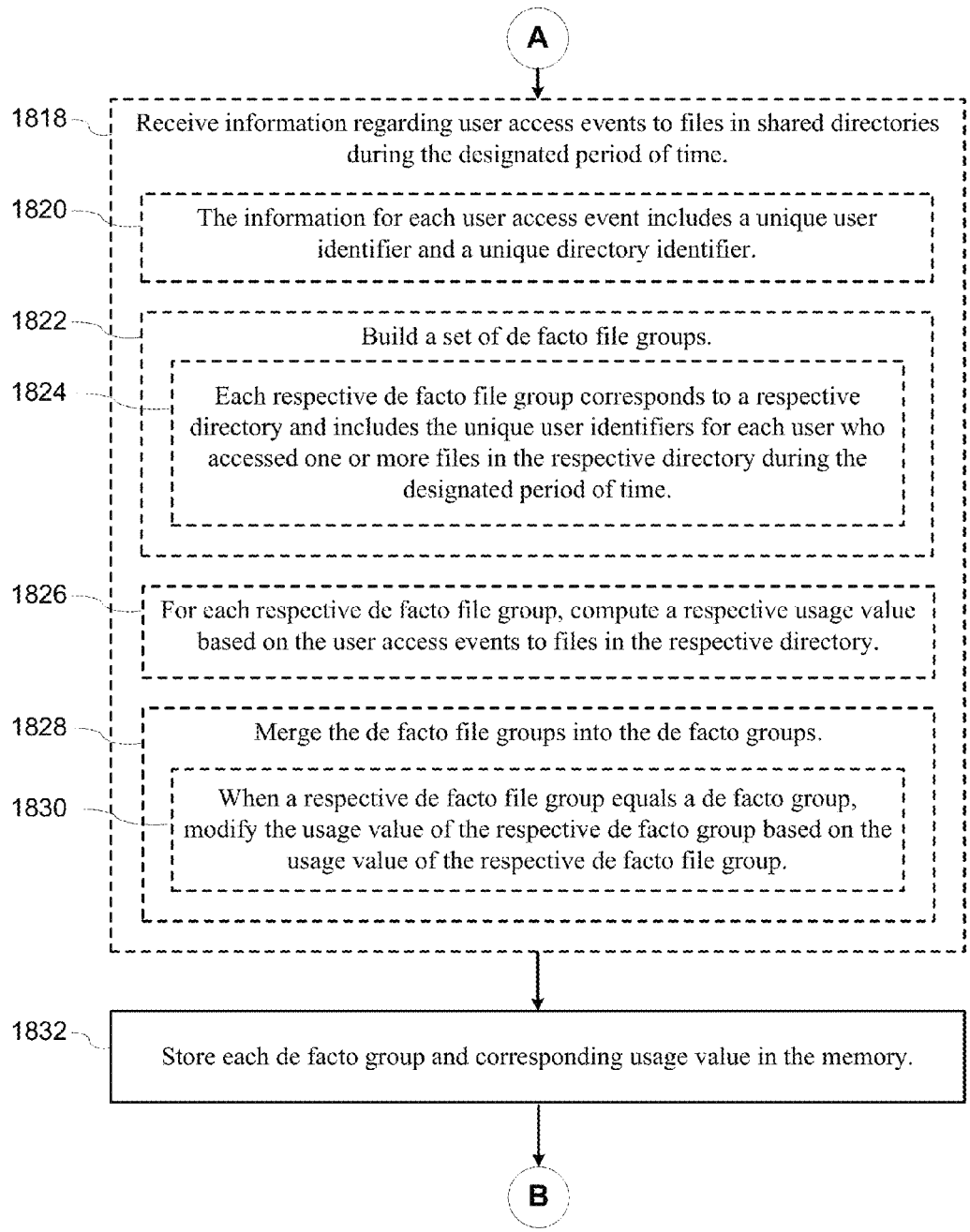
Figure 18C:
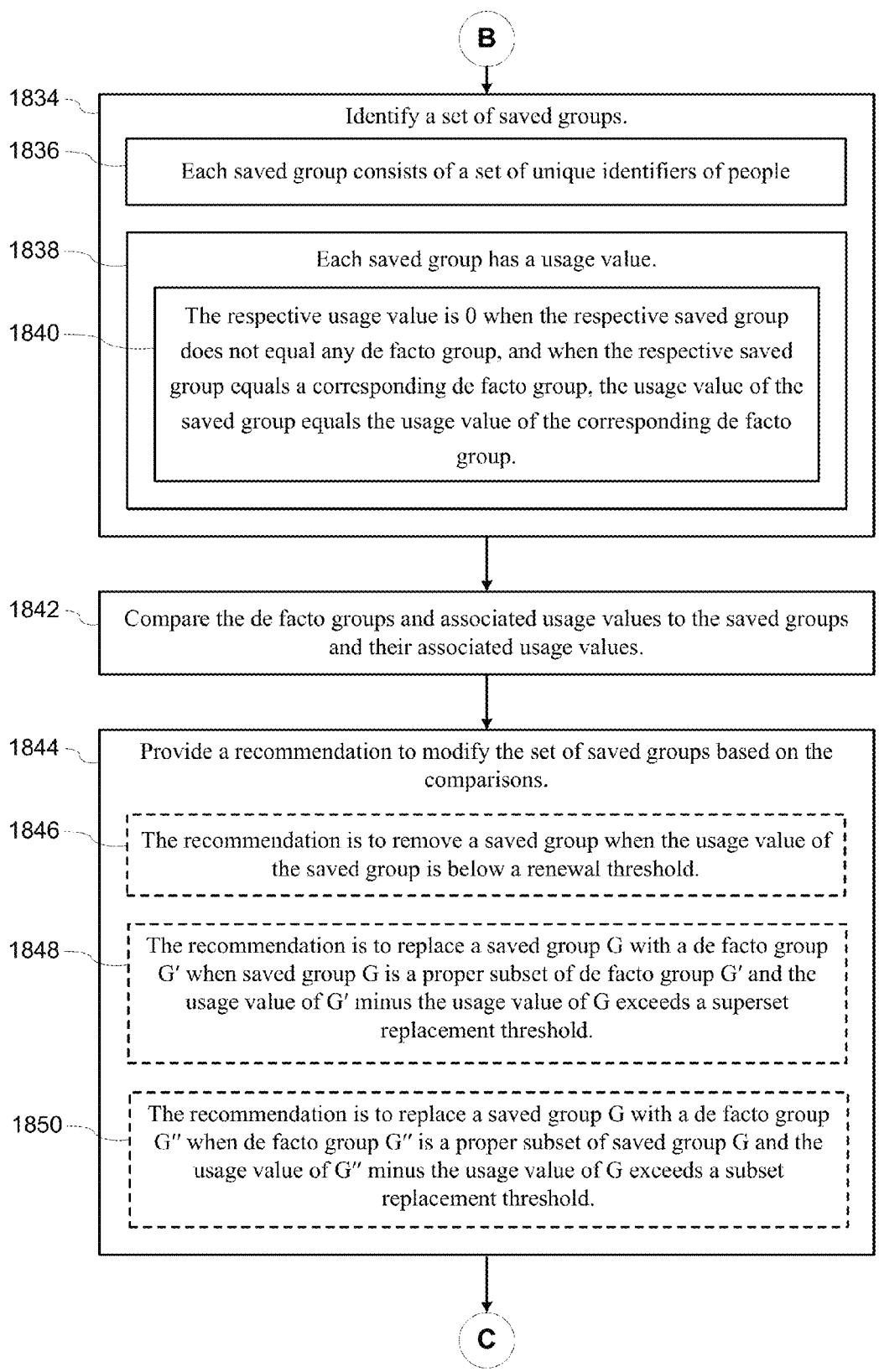
Figure 18D:
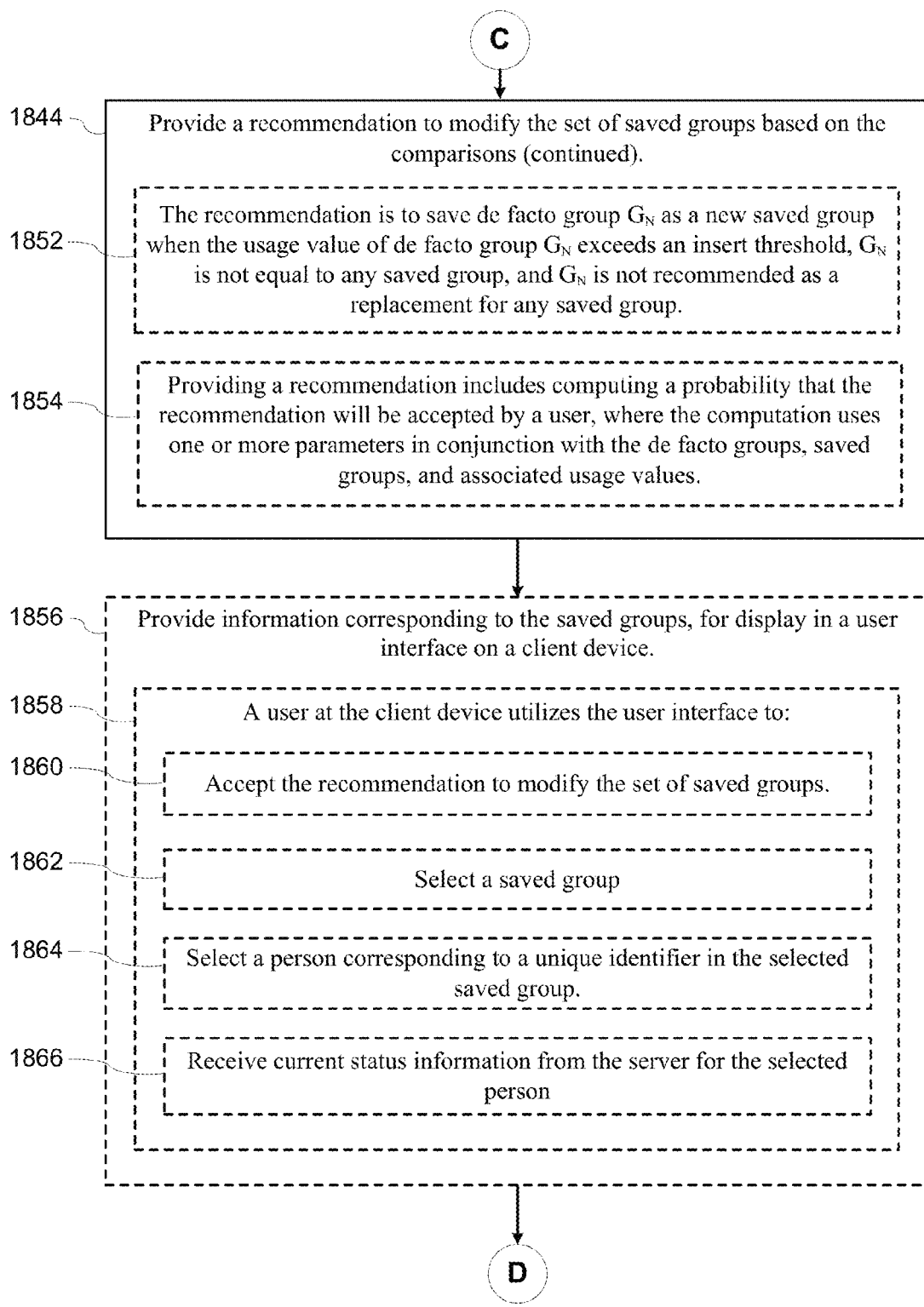
Figure 18E:
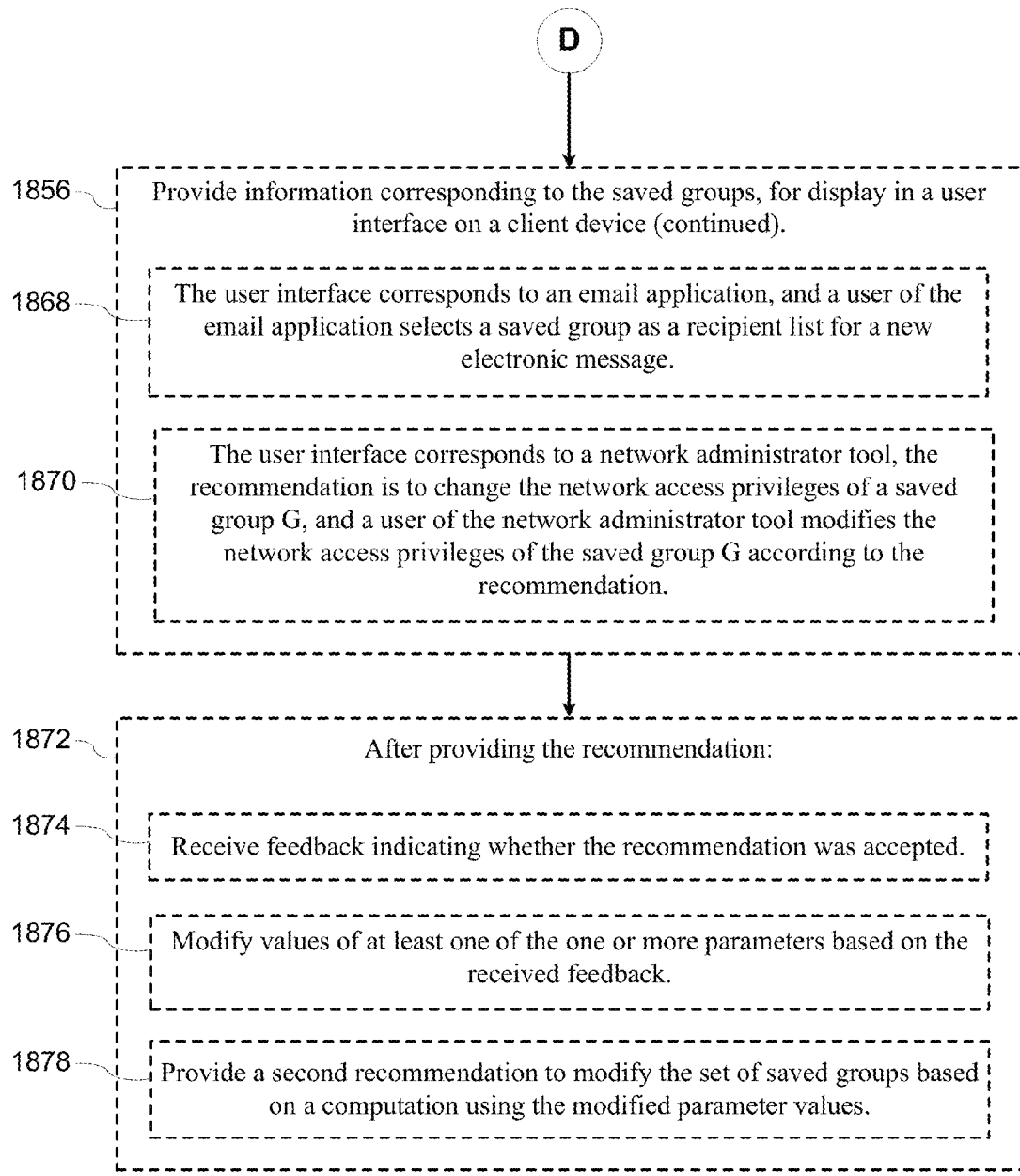

When groups for email and network access are combined, there are several issues to address. First, the unique identifiers for the users may be different in the two environments (e.g., email address versus network ID). In some environments, the network ID for a user is the first portion of the user's email address, and thus it is easy to correlate the data. Some implementations maintain a correlation table (or tables) on the network or on the analytic server 400 so that the data can be readily combined. Second, email and file access can have very different access patterns, so appropriate weights for the email usage values and file access usage values are determined. These numbers can be determined based on observations or assigned using a training process (e.g., sending feedback to the analytic server based on a user's acceptance or rejection of recommendations). FIG. 17 below illustrates a training process.

Figure 12:
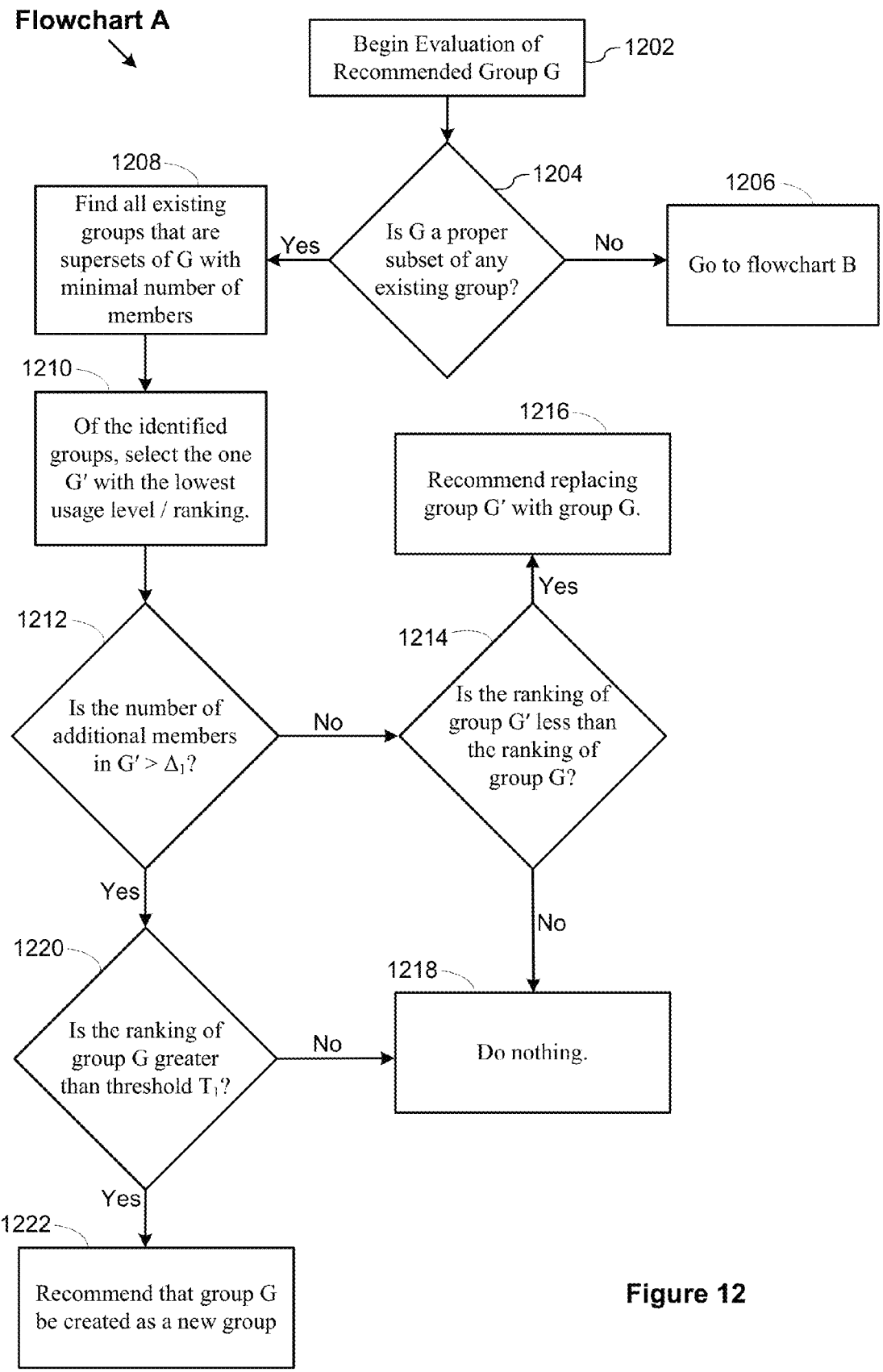
FIGS. 12 and 13 are flowcharts illustrating a process of providing group recommendations in accordance with some implementations.

Once the analytic server 400 builds the de facto groups 124 and computes the corresponding usage values, the analytic server 400 can make recommendations to a user 102 regarding the de factor groups. The first category of recommendations is the composition of the groups themselves. For example, the analytic server 400 can compare the de facto groups 124 to the existing saved groups 128, and recommend changes. This process is illustrated in FIG. 12 (Flowchart A) and FIG. 13 (Flowchart B). Typically only de facto groups 124 with a sufficiently high usage value are considered for the recommendation process. In some implementations, the five de facto groups 124 for a user 102 that have the highest usage value are evaluated (1202). If one of the top de facto groups 124 is already a saved existing group 128, then there are no changes to recommend for that de facto group 124.

Given a top de facto group G, the evaluation process begins (1202) by determining (1204) whether group G is a proper subset of any existing group (i.e., are there any existing groups that have all of the members of G plus some more?). If not, the analysis proceeds (1206) to Flowchart B in FIG. 13. Assuming there are one or more existing groups that are proper supersets of G, the process identifies (1208) all of those existing groups with the smallest number of members. For example, if G has three members, and there are existing groups with four or five members that contain G, then the process identifies all such groups with 4 members. There may be more than one such group. For example, if G={A, B, C}, there could be existing groups {A, B, C, D} and {A, B, C, E}, each with four members. Of these identified existing groups with the least number of members, the process selects (1210) the one G' with the smallest usage value. (If there is a tie for smallest usage, then one of those can be chosen arbitrarily.)

The process then determines (1212) how close G is to G'. If they are close, then the process may recommend replacing G' with G. To measure closeness, the process determines (1212) if the number of additional members in G' is greater than a threshold value $\Delta_1$. In some implementations, the threshold value $\Delta_1$ is 1. For example, if G is {A, B, C}, G' is {A, B, C, D, E}, and $\Delta_1$ is 1, then the number of additional members is 2, exceeding the threshold. If the answer is yes, then process determines (1220) if the ranking (i.e., usage value) of group G is greater than a creation threshold $T_1$. If so, the analytic server recommends (1222) creating G as a new group. If the answer is no, the analytic server makes no recommendation based on group G.

Going back to the number of additional member in G', if the number of additional members is less than or equal to the threshold $\Delta_1$, the analytic server 400 proceeds to compare (1214) the usage value of G to the usage value of G'. Since G and G' are close to each other, if G has a higher usage, the analytic server recommends (1216) replacing G' with G. On the other hand, if G' has a higher usage value than G, the analytic server recommends (1218) nothing with respect to group G.

Figure 13:
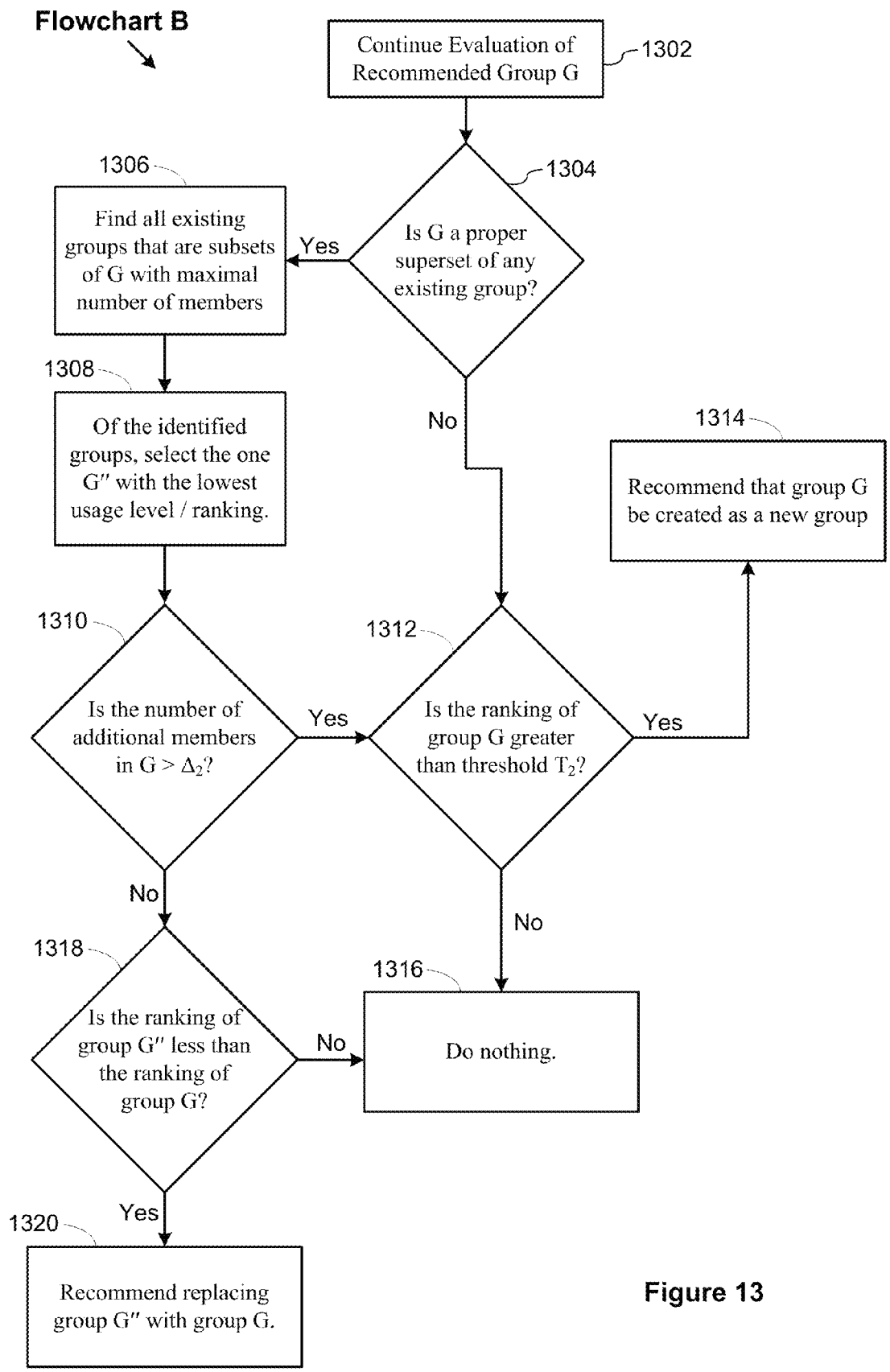

Flowchart B in FIG. 13 compares G to subsets rather than supersets. This continues (1302) from the evaluation process in Flowchart A. Initially, the analytic server determines (1304) if G is a proper superset of any existing group. If so, the analytic server identifies (1306) all existing groups that are subsets of G and have a maximal number of elements. For example, if G={A, B, C}, and there are existing groups {A, B} and {A, C}, then both of these sets are maximal subsets of G. Of the identified maximal sets, the process then selects (1308) the one G" with the lowest usage value. (In case of tie for lowest usage value, one can be arbitrarily selected.)

Next, the analytic server determines (1310) whether the number of additional members in G is greater than a threshold value $\Delta_2$. In some implementations, the threshold value $\Delta_2$ is 1. If the number of additional members in G is at most $\Delta_2$, the process then compares (1318) the ranking (i.e., usage value) of G to the usage value of G". If the ranking of G" is less than the ranking of G, the analytic server recommends (1320) replacing group G" with group G. In some implementations, the analytic server makes the recommendation only if the usage value of G is sufficiently greater than the usage value of G". If G" has a usage value that is greater than or equal to the usage value of G, then the analytic server makes no recommendation with respect to G.

As shown in the flowchart in FIG. 13, there are two ways to get to decision box 1312. One way to get there is if there are no existing groups that are a proper subset of group G. Another way is for the number of additional members in G to be greater than the threshold $A_2$. In box 1312, the analytic server determines whether the ranking (i.e., usage value) of group G exceeds an insertion threshold $T_2$. If so, the analytic server 400 recommends (1314) creating de facto group G as a new group. Otherwise, the analytic server 400 makes no recommendation with respect to group G.

Figure 14:
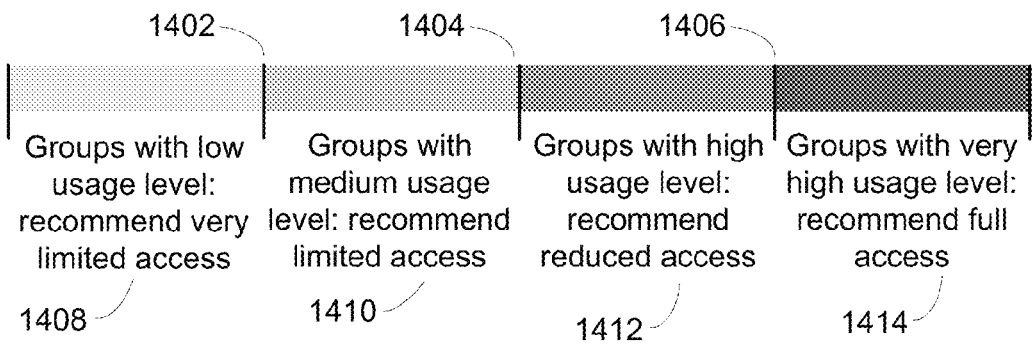
FIG. 14 illustrates a way of recommending file access privileges for a group based on the relative activity within the group in accordance with some implementations.

FIG. 14 illustrates how the usage level of groups can be used to recommend access levels. In this illustration, there are three threshold values 1402, 1404, and 1406, which separate the groups into four usage levels: low usage 1408, medium usage 1410, high usage 1412, and very high usage 1414. Here, each of the usage levels corresponds to a different access recommendation. In some implementations, the access levels are for access to files stored in a network directory. In other implementations, the access levels are for presence/awareness data. For example, a user could enable colleagues in project A (with very high usage) to see his mobile tracking data, but preclude colleagues in project B (with lower usage) to see that data.

Figure 15:
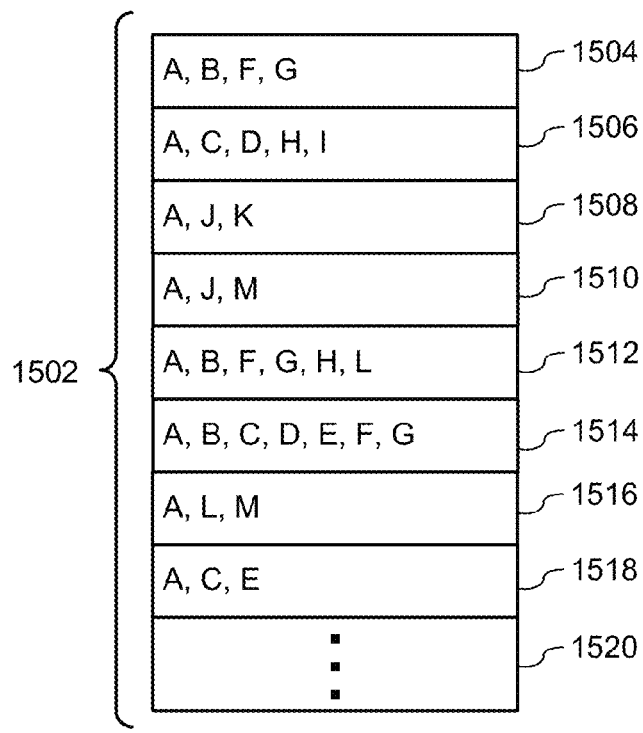
FIG. 15 illustrates ordering groups based on their relative usage levels in accordance with some implementations.

FIG. 15 illustrates that groups can be presented to a user in some implementations based on their usage level. For example, in implementations where an email application 520 presents groups 128 as distribution lists, the list 1502 may be presented so that the most probable distribution list 1504 is at the top. In this illustration, the distribution list 1506 has lower usage that distribution list 1504, distribution list 1508 has lower usage than distribution list 1506, and so on for distribution lists 1510, 1512, 1514, 1516, and 1518. In some implementations, there are many more distribution lists 1520, which can be accessed by scrolling, incremental search, clicking a "more" button, and so on. In some implementations, a user 102 can assign a name to each of the distribution list (e.g., "Proj. A" for the group of individuals in this project), which enables faster recognition of the group.

Figure 16:
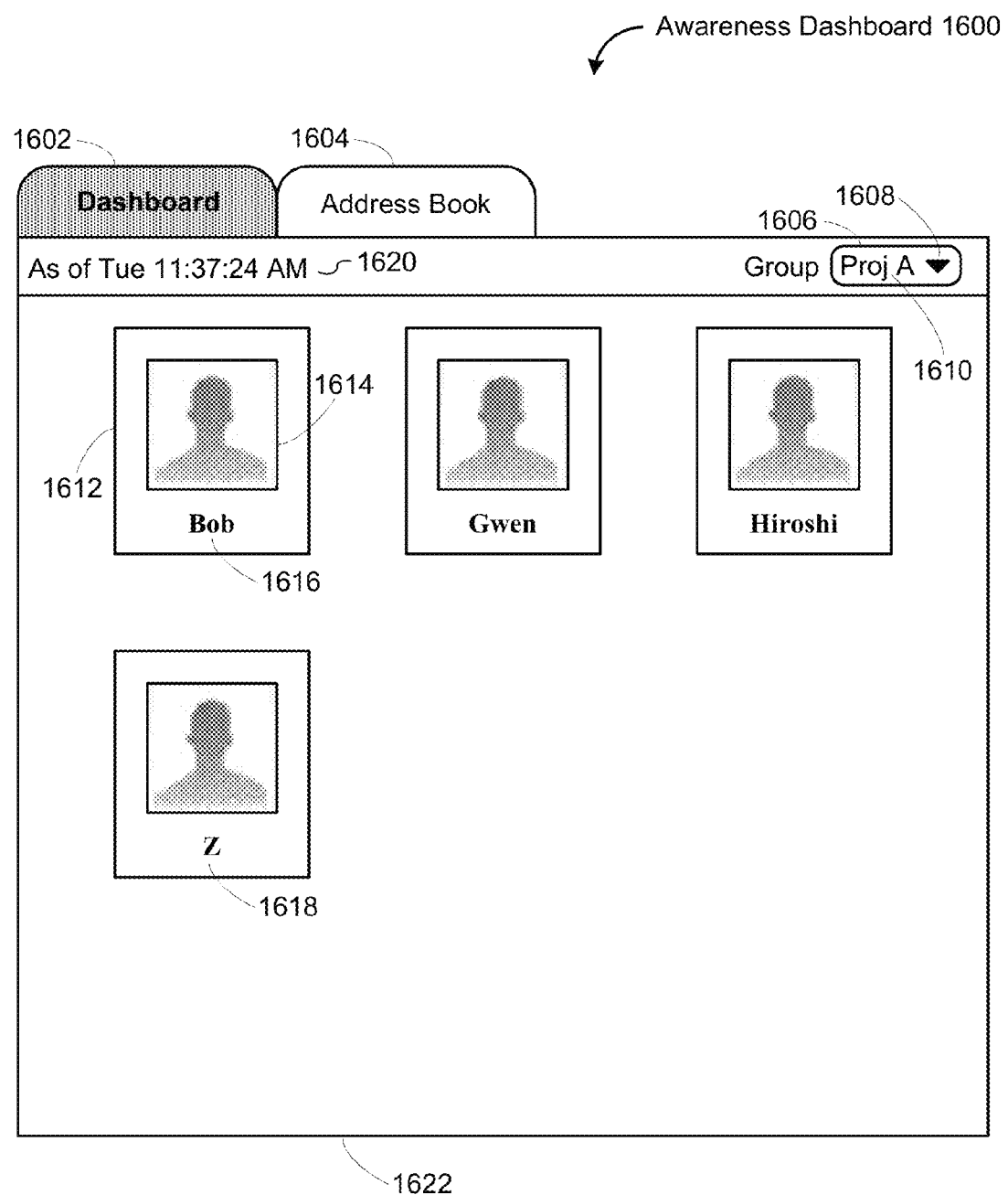
FIG. 16 illustrates how a presence/awareness system can utilize recommended groups in accordance with some implementations.

FIG. 16 illustrates how the group recommendations can assist a user with an awareness dashboard 1600 in some implementations of an awareness application 524. For example, the myUnity system includes a dashboard 1600 to provide status information about colleagues. In this example, the dashboard tab 1602 is currently displayed, and the address book tab 1604 is not visible. The dashboard includes a time indicator 1620, which specifies the timestamp when the data was last updated, and a group selector 1606. The currently selected group is "Proj A" 1610, and other groups can be selected using the drop-down arrow 1608. In some implementations, there is a default group "All" that includes all of the individuals within an organization. In this illustration, the groups are selected by name, which are generally defined by an individual user. For example, if there two or more individuals in project A, then one of the individuals might name the groups "Proj A" 1610, whereas another individual could name it "A."

As shown in this illustration, the group "Proj A" 1610 has 4 members, who are illustrated in the large window 1622. In some implementations of an awareness application 524, each individual is depicted inside a frame 1612, with a small photo 1614, and a caption that includes the individual's name, such as "Bob" 1616. In some implementations, a user 102 can select a name for each of the individuals, which can be a first name, first and last name, or any other meaningful descriptor, such as "Z" 1618. In many implementations, the names and other information are available in the Address Book 1604, so a user 102 does not need to enter the name of an individual multiple times (e.g., when a person is in multiple groups). In general, an awareness application 524 also provides status information about each of the individuals displayed. The status information is generally displayed inside the frame 1612. In some implementations, status information is displayed in response to hovering the cursor inside a frame 1612, or clicking inside a frame 1612. In other implementations, the status information is automatically displayed, without user action to prompt the display. In some implementations, the status information is automatically updated periodically, and the time indicator 1620 indicates when the last update occurred.

As FIG. 16 illustrates, it can be much easier to find an individual person when a group is identified first. In this example, the "Proj A" group has only four members, whereas the total number of people in the company could be hundreds or thousands. In some implementations, the user 102 of the awareness application 524 is excluded from the group because the user typically is not interested in status information about himself/herself. In other implementations, the user, as a member of a group, is included. Of course the groups do not prevent a user 102 from looking up other individuals as well. A user can use the Address Book tab 1604, use a search box (not illustrated), display the group "All" to look up alphabetically, and so on.

FIG. 17 illustrates a process employed in some implementations where a user's acceptance or rejection of a recommendation is used as feedback to improve future recommendations. Using the techniques illustrated earlier in FIGS. 7-13, the analytic server 400 calculates (1702) a recommendation. The recommendation could be to add a new group, modify an existing group, or remove a group. Adding new groups and modifying existing groups is illustrated in FIGS. 12 and 13. Removing a group is recommended when the usage level of an existing group falls below a threshold usage. In addition, the recommendation can be to set different access privileges for a group based on the level of usage, as illustrated in FIG. 14.

The analytic server 400 sends (1704) the recommendation to a user device 500 used by a user 102. The user 102 can then choose to accept (1706) or reject (1706) the recommendation. The user device 500 then sends (1708) feedback to the analytic server 400 indicating whether the recommendation was accepted or rejected. The analytic server 400 then revises (1710) certain calculation parameters by incorporating the received feedback. For example, the analytic server could change the weighting of the email data versus file server data, or change a threshold value that triggers a recommendation.

In some implementations, the analytic server 400 receives (1712) additional usage data (e.g., email and/or file server access) before computing a new recommendation. In other implementations, the recommendation module 126 executes before additional usage data is received. Of course, regardless of when the recommendation module 126 executes again, it does not necessarily generate a recommendation to change any of the existing saved groups 128. That is, the groups 128 may be just fine, so no changes are appropriate.

As shown in FIG. 17, the analytic server 400 later calculates (1714) a new recommendation, and sends (1716) the new recommendation to the user device 500. The user 102 then accepts or rejects the new recommendation, and sends that feedback to the analytic server, thus continually improving the quality of the recommendations.

FIGS. 18A-18E provide a flowchart of how some implementations build groups, make recommendations based on the usage levels of those groups, and utilize those groups in various software applications.

The recommendation process 1800 executes (1802) at a server (or group of servers) having one or more processors and memory. In some implementations, the recommendation process is performed by the recommendation module 126, illustrated in FIG. 4. The server receives (1804) email header information for a plurality of electronic messages that were sent during a designated period of time. The period of time may be a single day, a week, a month, or any other span of time, and typically repeats on a regular basis (e.g., every Sunday receiving the email headers for the past week). For example, in some implementations, the server receives (1804) email header information every day, commencing at 2:00 AM, receiving the data for all messages sent between 2:00 AM the previous day up to 2:00 AM on the current day.

The email header information for an electronic message includes (1806) a unique identifier of the sender, and a unique identifier for each recipient of the electronic message. In some implementations, the unique identifiers are the email addresses of the recipients, but other implementations use alternative unique identifiers, such as a GUID or system generated unique key. In some implementations, the set of recipients includes individuals identified in the TO line, CC line, and BCC line, but some implementations exclude individuals on the BCC line.

Implementations typically exclude electronic messages that originate from outside the designated organization (e.g., workplace). For example, if employees of an organization all have email addresses of the form somebody@fxpal.com, then any electronic messages received from a domain other than fxpal.com would not be included in the processing. Such external messages generally are not useful to identifying groups within the organization. Electronic messages that originate within the organization, but have one or more recipients outside the organization are handled in different ways depending on the implementation. In some implementations, these electronic messages are excluded as well. In some implementations, the external recipients are removed, and as long as there is at least one recipient within the organization, the processing proceeds with the modified set of recipients. Some implementations support multiple domain names and/or ranges of IP addresses as being "inside" the organization. Some implementations also support selecting specific email addresses (or categories of email addresses) for inclusion in the grouping process, even though they are outside the organization. For example, some individuals from a consulting organization may be working on projects with people from the organization. It may be useful to include the consulting individuals in groups.

The analytic server 400 builds (1808) a set of de facto groups 124 using the received email header information, as illustrated in FIGS. 6-8. Each de facto group consists of (1810) a set containing the unique identifiers corresponding to the sender and recipients of an electronic message for which email header information has been received. In some implementations, the BCC recipients are included; in other implementations, the BCC recipients are excluded. In some implementations, the unique identifiers are the email addresses of the sender and recipients, but other implementations use alternative unique identifiers, such as system generated keys.

For each (1812) of the de facto groups 124, the analytic server 400 computes (1814) the usage level based on the number of distinct electronic messages corresponding to the de facto group. An electronic message corresponds (1816) to a de facto group 124 when the set of unique identifiers corresponding to the sender and recipients of the electronic message is equal to the de facto group 124.

In some implementations, the analytic server 400 also receives (1818) information regarding user access events to files in shared directories during the same designated period of time. This is illustrated in FIGS. 9-11. Some implementations receive file access information from a document control system or version control system instead of or in addition to shared file access on a file server 200. The information for each user access event includes (1820) a unique user identifier (e.g., network user ID) and a unique directory identifier (e.g., full network path).

The analytic server 400 builds (1822) a set of de facto file groups. Each de facto file group corresponds (1824) to a respective directory and includes (1824) the unique user identifiers for each user who accessed one or more files in the respective directory during the designated period of time. Generally, directories that are too shallow (such as a root directory or a first level directory) are excluded because they do not provide meaningful information about the grouping of users. In addition, some implementations "collapse" the directory when it is very deep. For example, some implementations use only the top four directories for each file access. This is illustrated in file access 1024 in FIG. 10 and the associated description.

For each de facto file group, the analytic server 400 computes (1826) a usage level based on the number of user access events to files in the respective directory. Then, the analytic server 400 merges (1828) the de facto file groups into the de facto groups 124. When a respective de facto file group equals a de factor group, the analytic server modifies (1830) the usage value of the respective de facto group based on the usage value of the respective de facto file group. Combining the groups built from two distinct sources typically includes multiplying the usage level values by a weighting factor and adding them. For example, for a group G with email usage value $E_G$ and file usage value $F_G$, the combined usage value $C_G$ is $W_E E_G + W_F F_G$ for some weight values $W_E$ and $W_F$. In some implementations, the weights are modified over time based on user feedback, as illustrated and described with respect to FIG. 17.

The analytic server 400 stores (1832) each de facto group 124 and corresponding usage value in memory, typically non-volatile memory. The analytic server then identifies (1834) the set of saved groups 128. Just like the de facto group 124, each saved group 128 consists of (1836) a set of unique identifiers of people. The analytic server assigns (1838) a usage value to each saved group 128 using the usage values for the de facto groups 124. When a saved group 128 does not equal any de facto group 124, the usage value of the saved group 128 is (1840) zero. When a saved group 128 does equal a de facto group 124, the usage value of the saved group is set (1840) equal to the usage value of the corresponding de facto group.

The analytic server 400 then compares (1842) the de facto groups 124 and their associated usage values to the saved groups 128 and their usage values. As a result of the comparisons, the analytic server 400 provides (1844) a recommendation to modify the set of saved groups 128. Sometimes the recommendation is (1846) to remove a saved group when the usage value of the saved group is below a renewal threshold. Over time, some groups are no longer used, or used very little, so it is helpful to eliminate them. Sometimes the recommendation is (1848) to replace a saved group G with a de facto group G' when the saved group G is a proper subset of de facto group G' and the usage value of G' minus the usage value of G exceeds a superset replacement threshold. In this case, it appears that one or more members have joined the former group G to create a larger group G'.

Sometimes the recommendation is (1850) to replace a saved group G with a de facto group G" when de facto group G" is a proper subset of saved group G and the usage value of G" minus the usage value of G exceeds a subset replacement threshold. Here, it appears that one or more members are no longer part of the group, so the group should be updated to reflect the smaller membership. Sometimes the recommendation is (1852) to save a de facto group $G_N$ as a new saved group when: the usage value of de facto group $G_N$ exceeds an insert threshold; $G_N$ is not equal to any saved group; and $G_N$ is not recommended as a replacement for any saved group. In this case, $G_N$ appears to be a brand new group, and not a modification of an existing group.

In some implementations, providing a recommendation includes (1854) computing a probability that the recommendation will be accepted by a user, and the computation uses one or more parameters in conjunction with the de facto groups, saved groups, and associated usage values. As illustrated in FIG. 17, the parameters in the computation are subsequently updated based on feedback from the user 102.

In some implementations, the analytic server 400 provides (1856) information corresponding to the saved groups 128, for display in a user interface on a client device 500. A user 102 at the client device 500 utilizes (1858) the user interface to accept (1860) (or reject) the recommendation to modify the set of saved groups 128. The user 102 then selects (1862) one of the saved groups in the user interface, and selects (1864) a person corresponding to a unique identifier in the selected saved group. The client device 500 then receives (1866) current status information from the analytic server for the selected person, and displays the status information in the user interface. In alternate implementations, status information is received (1866) for all of the people in the selected group as soon as the group is selected, and the status information is displayed in the user interface without the user selecting a specific person. The display of status information is illustrated in FIG. 16. One such implementation is the myUnity system provided by Fuji Xerox.

In some implementations, the user interface corresponds (1868) to an email application 520, and a user 102 of the email application 520 selects a saved group 128 as a recipient list for a new electronic message. In some implementations, the user interface corresponds (1870) to a network administrator tool, and the recommendation is to change the network access privileges of a saved group G. In these implementations, a user of the network administrator tool modifies the network access privileges of the saved group G according to the recommendation.

As illustrated in FIG. 17, after providing (1872) the recommendation, some implementations receive (1874) feedback indicating whether the recommendation was accepted. The analytic server then modifies (1876) the values of at least one of the one or more parameters (see 1854) based on the received feedback. Subsequently, the analytic server provides (1878) a second recommendation to modify the set of saved groups based on a computation using the modified parameter values. This iterative process of making recommendations and incorporating the feedback from the recommendations enables the analytic server to improve its recommendations.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of managing contact groups, performed at a server having one or more processors and memory, the method comprising:
- identifying a set of saved groups, wherein each saved group has been created by a user and consists of a set of unique identifiers of people;
- receiving email header information for a plurality of electronic messages that were sent during a designated period of time, wherein the email header information for an electronic message includes a unique identifier of the sender, and a unique identifier for each recipient of the electronic message;
- building a set of de facto groups using the received email header information, wherein each de facto group consists of a set containing the unique identifiers corresponding to the sender and recipients of an electronic message for which email header information was received;
- for each respective de facto group, computing a respective usage value as a sum of respective weights for electronic messages corresponding to the respective de facto group, wherein each respective weight is based on how recently the respective message was sent, and an electronic message corresponds to a de facto group when the set of unique identifiers corresponding to the sender and recipients of the electronic message is equal to the set of unique identifiers in the de facto group;
- storing each de facto group and corresponding usage value in the memory;
- comparing the de facto groups to the saved groups, wherein the comparing includes:
  - comparing membership of the de facto groups to membership of the saved groups;
  - assigning a respective usage value to each saved group using the usage values of the de facto groups, wherein a respective usage value of a respective saved group is set to 0 when membership of the respective saved group does not equal membership of any de facto group, and when membership of the respective saved group equals membership of a respective de facto group, the usage value of the respective saved group is set to the usage value of the respective de facto group; and,
  - for at least one de facto group that is different from any saved group in terms of membership, comparing the at least one de facto group and its associated usage value to the saved groups and their associated usage values; and
- providing a recommendation to modify the set of saved groups based on the comparisons.

2. The method of claim 1, wherein the recommendation is to remove a saved group when the usage value of the saved group is below a renewal threshold.

3. The method of claim 1, wherein the recommendation is to replace a saved group G with a de facto group G' when saved group G is a proper subset of de facto group G' and the usage value of G' minus the usage value of G exceeds a superset replacement threshold.

4. The method of claim 1, wherein the recommendation is to replace a saved group G with a de facto group G" when de facto group G" is a proper subset of saved group G and the usage value of G" minus the usage value of G exceeds a subset replacement threshold.

5. The method of claim 1, wherein the recommendation is to save de facto group $G_N$ as a new saved group when the usage value of de facto group $G_N$ exceeds an insert threshold, $G_N$ is not equal to any saved group, and $G_N$ is not recommended as a replacement for any saved group.

6. The method of claim 1, further comprising:
- receiving information regarding user access events to files in shared directories during the designated period of time, the information for each user access event including a unique user identifier and a unique directory identifier;
- building a set of de facto file groups, wherein each respective de facto file group corresponds to a respective directory and includes the unique user identifiers for each user who accessed one or more files in the respective directory during the designated period of time;
- for each respective de facto file group, computing a respective usage value based on the user access events to files in the respective directory; and
- merging the de facto file groups into the de facto groups, and when a respective de facto file group equals a de facto group, modifying the usage value of the respective de facto group based on the usage value of the respective de facto file group.

7. The method of claim 1, further comprising providing information corresponding to the saved groups, for display in a user interface on a client device.

8. The method of claim 7, wherein a user at the client device utilizes the user interface to:
- accept the recommendation to modify the set of saved groups;
- select a saved group; and
- receive and view current status information from the server for the people in the selected saved group.

9. The method of claim 7, wherein the user interface corresponds to an email application, and a user of the email application selects a saved group as a recipient list for a new electronic message.

10. The method of claim 7, wherein the user interface corresponds to a network administrator tool, the recommendation is to change the network access privileges of a saved group G, and a user of the network administrator tool modifies the network access privileges of the saved group G according to the recommendation.

11. The method of claim 1, wherein providing a recommendation includes computing a probability that the recommendation will be accepted by a user, the computation using one or more parameters in conjunction with the de facto groups, saved groups, and associated usage values;
the method further comprising after providing the recommendation:
- receiving feedback indicating whether the recommendation was accepted;
- modifying values of at least one of the one or more parameters based on the received feedback; and
- providing a second recommendation to modify the set of saved groups based on a computation using the modified parameter values.

12. A system for managing contact groups, comprising:
one or more processors;
memory; and
one or more programs stored in the memory, the one or more programs comprising instructions for:
- identifying a set of saved groups, wherein each saved group has been created by a user and consists of a set of unique identifiers of people;
- receiving email header information for a plurality of electronic messages that were sent during a designated period of time, wherein the email header information for an electronic message includes a unique identifier of the sender, and a unique identifier for each recipient of the electronic message;

building a set of de facto groups using the received email header information, wherein each de facto group consists of a set containing the unique identifiers corresponding to the sender and recipients of an electronic message for which email header information was received;

for each respective de facto group, computing a respective usage value as a sum of respective weights for electronic messages corresponding to the respective de facto group, wherein each respective weight is based on how recently the respective message was sent, and an electronic message corresponds to a de facto group when the set of unique identifiers corresponding to the sender and recipients of the electronic message is equal to the set of unique identifiers in the de facto group;

storing each de facto group and corresponding usage value in the memory;

comparing the de facto groups to the saved groups, wherein the comparing includes:
  comparing membership of the de facto groups to membership of the saved groups;
  assigning a respective usage value to each saved group using the usage values of the de facto groups, wherein a respective usage value of a respective saved group is set to 0 when membership of the respective saved group does not equal membership of any de facto group, and when membership of the respective saved group equals membership of a respective de facto group, the usage value of the respective saved group is set to the usage value of the respective de facto group; and,
  for at least one de facto group that is different from any saved group in terms of membership, comparing the at least one de facto group and its associated usage value to the saved groups and their associated usage values; and providing a recommendation to modify the set of saved groups based on the comparisons.

13. The system of claim 12, wherein the recommendation is to remove a saved group when the usage value of the saved group is below a renewal threshold.

14. The system of claim 12, wherein the recommendation is to replace a saved group G with a de facto group G' when saved group G is a proper subset of de facto group G' and the usage value of G' minus the usage value of G exceeds a superset replacement threshold.

15. The system of claim 12, wherein the recommendation is to replace a saved group G with a de facto group G" when de facto group G" is a proper subset of saved group G and the usage value of G" minus the usage value of G exceeds a subset replacement threshold.

16. The system of claim 12, wherein the recommendation is to save de facto group $G_N$ as a new saved group when the usage value of de facto group $G_N$ exceeds an insert threshold, $G_N$ is not equal to any saved group, and $G_N$ is not recommended as a replacement for any saved group.

17. The system of claim 12, further comprising instructions for:
  receiving information regarding user access events to files in shared directories during the designated period of time, the information for each user access event including a unique user identifier and a unique directory identifier;
  building a set of de facto file groups, wherein each respective de facto file group corresponds to a respective directory and includes the unique user identifiers for each user who accessed one or more files in the respective directory during the designated period of time;
  for each respective de facto file group, computing a respective usage value based on the user access events to files in the respective directory; and
  merging the de facto file groups into the de facto groups, and when a respective de facto file group equals a de facto group, modifying the usage value of the respective de facto group based on the usage value of the respective de facto file group.

18. The system of claim 12, further comprising instructions for providing information corresponding to the saved groups, for display in a user interface on a client device.

19. The system of claim 18, wherein a user at the client device utilizes the user interface to:
  accept the recommendation to modify the set of saved groups;
  select a saved group; and
  receive and view current status information from the server for the people in the selected group.

20. The system of claim 18, wherein the user interface corresponds to an email application, and a user of the email application selects a saved group as a recipient list for a new electronic message.

21. The system of claim 18, wherein the user interface corresponds to a network administrator tool, the recommendation is to change the network access privileges of a saved group G, and a user of the network administrator tool modifies the network access privileges of the saved group G according to the recommendation.

22. The system of claim 12, wherein providing a recommendation includes computing a probability that the recommendation will be accepted by a user, the computation using one or more parameters in conjunction with the de facto groups, saved groups, and associated usage values;
  the system further comprising instructions, executed after providing the recommendation, for:
    receiving feedback indicating whether the recommendation was accepted;
    modifying values of at least one of the one or more parameters based on the received feedback; and
    providing a second recommendation to modify the set of saved groups based on a computation using the modified parameter values.

23. A non-transitory computer readable storage medium storing one or more programs configured for execution by a computer, the one or more programs comprising instructions for:
  identifying a set of saved groups, wherein each saved group has been created by a user and consists of a set of unique identifiers of people;
  receiving email header information for a plurality of electronic messages that were sent during a designated period of time, wherein the email header information for an electronic message includes a unique identifier of the sender, and a unique identifier for each recipient of the electronic message;
  building a set of de facto groups using the received email header information, wherein each de facto group consists of a set containing the unique identifiers corresponding to the sender and recipients of an electronic message for which email header information was received;

for each respective de facto group, computing a respective usage value as a sum of respective weights for electronic messages corresponding to the respective de facto group, wherein each respective weight is based on how recently the respective message was sent, and an electronic message corresponds to a de facto group when the set of unique identifiers corresponding to the sender and recipients of the electronic message is equal to the set of unique identifiers in the de facto group;

storing each de facto group and corresponding usage value in the memory;

comparing the de facto groups to the saved groups, wherein the comparing includes:
  comparing membership of the de facto groups to membership of the saved groups;
  assigning a respective usage value to each saved group using the usage values of the de facto groups, wherein a respective usage value of a respective saved group is set to 0 when membership of the respective saved group does not equal membership of any de facto group, and when membership of the respective saved group equals membership of a respective de facto group, the usage value of the respective saved group is set to the usage value of the respective de facto group; and,
  for at least one de facto group that is different from any saved group in terms of membership, comparing the at least one de facto group and its associated usage value to the saved groups and their associated usage values; and providing a recommendation to modify the set of saved groups based on the comparisons.

* * * * *